(12) United States Patent
Derakhshan et al.

(10) Patent No.: US 11,737,857 B2
(45) Date of Patent: Aug. 29, 2023

(54) SYSTEMS AND METHODS FOR CORRECTING MALOCCLUSIONS OF TEETH

(71) Applicant: ALIGN TECHNOLOGY, INC., San Jose, CA (US)

(72) Inventors: Mitra Derakhshan, Herndon, VA (US); Crystal Tjhia, Sunnyvale, CA (US); Rohit Tanugula, San Jose, CA (US); Yaser Shanjani, Sunnyvale, CA (US); Ryan Kimura, San Jose, CA (US); Bruce Cam, San Jose, CA (US); Eric Yau, Saratoga, CA (US); Yuxiang Wang, San Jose, CA (US); Ken Wu, San Jose, CA (US); Peter Webber, Redwood City, CA (US); Jun Sato, San Jose, CA (US); John Y. Morton, San Jose, CA (US)

(73) Assignee: ALIGN TECHNOLOGY, INC., San Jose, CA (US)

( * ) Notice: Subject to any disclaimer, the term of this patent is extended or adjusted under 35 U.S.C. 154(b) by 360 days.

(21) Appl. No.: 16/176,860

(22) Filed: Oct. 31, 2018

(65) Prior Publication Data
US 2019/0125497 A1 May 2, 2019

Related U.S. Application Data

(60) Provisional application No. 62/580,362, filed on Nov. 1, 2017.

(51) Int. Cl.
*A61C 7/36* (2006.01)
*A61C 7/10* (2006.01)
(Continued)

(52) U.S. Cl.
CPC .............. *A61C 7/36* (2013.01); *A61C 7/002* (2013.01); *A61C 7/08* (2013.01); *A61C 7/10* (2013.01);
(Continued)

(58) Field of Classification Search
CPC .. A61C 7/36; A61C 7/002; A61C 7/08; A61C 7/10; A61C 7/16; A61C 7/14;
(Continued)

(56) References Cited

U.S. PATENT DOCUMENTS

| 2,171,695 A | 9/1939 | Harper et al. |
| 2,467,432 A | 4/1949 | Kesling et al. |

(Continued)

FOREIGN PATENT DOCUMENTS

| AU | 3031677 A | 5/1979 |
| AU | 517102 B2 | 7/1981 |

(Continued)

OTHER PUBLICATIONS

"Anotherinvisalignblog. Invisalign Virtual Bite Ramps. Posted Jun. 17, 2012. 5 pages. Retrieved Aug. 14, 2013 from http://anotherinvisalignblog.wordpress.com/2012/06/17/invisalign-lingual-power-ridges-photos/."

(Continued)

*Primary Examiner* — Ralph A Lewis
*Assistant Examiner* — Mirayda A Aponte
(74) *Attorney, Agent, or Firm* — FisherBroyles, LLP

(57) ABSTRACT

A system for correcting class III malocclusions is disclosed. The system may include a maxilla appliance having tooth receiving cavities shaped to receive teeth of the maxilla and a first coupling for receiving an elastic. The system may also include a mandibular appliance having tooth receiving cavities shaped to receive teeth of the mandible. In some embodiments, the system includes a class III corrective (Continued)

appliance having a first mount shaped to engage with the mandibular arch of the patient and having a second coupling shaped to receive the elastic.

20 Claims, 12 Drawing Sheets

(51) Int. Cl.
| | |
|---|---|
| *A61C 7/00* | (2006.01) |
| *A61C 7/08* | (2006.01) |
| *B29C 64/40* | (2017.01) |
| B29C 64/386 | (2017.01) |
| B33Y 50/02 | (2015.01) |
| B29L 31/00 | (2006.01) |
| B29C 64/106 | (2017.01) |

(52) U.S. Cl.
CPC .......... *B29C 64/106* (2017.08); *B29C 64/386* (2017.08); *B29C 64/40* (2017.08); *B29L 2031/7536* (2013.01); *B33Y 50/02* (2014.12)

(58) Field of Classification Search
CPC ..... A61C 7/303; A61C 7/00; A61C 2007/004; A61C 19/04; A61C 19/05; A61C 19/052; B33Y 50/02; B29C 64/386; B29C 64/40; B29C 64/106; B29L 2031/7536; A61F 5/56; A61F 5/566; A61F 2005/563; G16H 30/40
USPC .......................................................... 433/19
See application file for complete search history.

(56) References Cited

U.S. PATENT DOCUMENTS

| | | |
|---|---|---|
| 2,531,222 A | 11/1950 | Kesling et al. |
| 3,379,193 A | 4/1968 | Monsghan et al. |
| 3,385,291 A | 5/1968 | Martin et al. |
| 3,407,500 A | 10/1968 | Kesling et al. |
| 3,478,742 A | 11/1969 | Bohlmann et al. |
| 3,496,936 A | 2/1970 | Gores et al. |
| 3,600,808 A | 8/1971 | Reeve et al. |
| 3,660,900 A | 5/1972 | Andrews et al. |
| 3,683,502 A | 8/1972 | Wallshein et al. |
| 3,738,005 A | 6/1973 | Cohen et al. |
| 3,860,803 A | 1/1975 | Levine et al. |
| 3,916,526 A | 11/1975 | Schudy et al. |
| 3,922,786 A | 12/1975 | Lavin et al. |
| 3,950,851 A | 4/1976 | Bergersen et al. |
| 3,983,628 A | 10/1976 | Acevedo et al. |
| 4,014,096 A | 3/1977 | Dellinger et al. |
| 4,195,046 A | 3/1980 | Kesling et al. |
| 4,253,828 A | 3/1981 | Coles et al. |
| 4,324,546 A | 4/1982 | Heitlinger et al. |
| 4,324,547 A | 4/1982 | Arcan et al. |
| 4,348,178 A | 9/1982 | Kurz |
| 4,419,992 A | 12/1983 | Chorbajian et al. |
| 4,478,580 A | 10/1984 | Barrut et al. |
| 4,500,294 A | 2/1985 | Lewis et al. |
| 4,504,225 A | 3/1985 | Yoshii |
| 4,505,673 A | 3/1985 | Yoshii et al. |
| 4,509,918 A | 4/1985 | Clark |
| 4,526,540 A | 7/1985 | Dellinger et al. |
| 4,575,330 A | 3/1986 | Hull et al. |
| 4,575,805 A | 3/1986 | Moermann et al. |
| 4,591,341 A | 5/1986 | Andrews et al. |
| 4,609,349 A | 9/1986 | Cain et al. |
| 4,611,288 A | 9/1986 | Duret et al. |
| 4,656,860 A | 4/1987 | Orthuber et al. |
| 4,663,720 A | 5/1987 | Duret et al. |
| 4,664,626 A | 5/1987 | Kesling et al. |
| 4,676,747 A | 6/1987 | Kesling et al. |
| 4,742,464 A | 5/1988 | Duret et al. |
| 4,755,139 A | 7/1988 | Abbatte et al. |
| 4,763,791 A | 8/1988 | Halverson et al. |
| 4,793,803 A | 12/1988 | Martz et al. |
| 4,798,534 A | 1/1989 | Breads et al. |
| 4,836,778 A | 6/1989 | Baumrind et al. |
| 4,837,732 A | 6/1989 | Brandestini et al. |
| 4,850,864 A | 7/1989 | Diamond et al. |
| 4,850,865 A | 7/1989 | Napolitano et al. |
| 4,856,991 A | 8/1989 | Breads et al. |
| 4,877,398 A | 10/1989 | Kesling et al. |
| 4,880,380 A | 11/1989 | Martz et al. |
| 4,889,238 A | 12/1989 | Batchelor et al. |
| 4,890,608 A | 1/1990 | Steer et al. |
| 4,935,635 A | 6/1990 | O'Harra et al. |
| 4,936,862 A | 6/1990 | Walker et al. |
| 4,937,928 A | 7/1990 | van der Zel |
| 4,941,826 A | 7/1990 | Loran et al. |
| 4,964,770 A | 10/1990 | Steinbichler et al. |
| 4,975,052 A | 12/1990 | Spencer et al. |
| 4,983,334 A | 1/1991 | Adell et al. |
| 5,011,405 A | 4/1991 | Lemchen et al. |
| 5,017,133 A | 5/1991 | Miura et al. |
| 5,027,281 A | 6/1991 | Rekow et al. |
| 5,035,613 A | 7/1991 | Breads et al. |
| 5,055,039 A | 10/1991 | Abbatte et al. |
| 5,059,118 A | 10/1991 | Breads et al. |
| 5,100,316 A | 3/1992 | Wildman et al. |
| 5,103,838 A | 4/1992 | Yousif et al. |
| 5,121,333 A | 6/1992 | Riley et al. |
| 5,125,832 A | 6/1992 | Kesling |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax et al. |
| 5,184,306 A | 2/1993 | Erdman et al. |
| 5,186,623 A | 2/1993 | Breads et al. |
| 5,257,203 A | 10/1993 | Riley et al. |
| 5,273,429 A | 12/1993 | Rekow et al. |
| 5,278,756 A | 1/1994 | Lemchen et al. |
| 5,324,196 A | 6/1994 | Magill |
| 5,328,362 A | 7/1994 | Watson et al. |
| 5,338,198 A | 8/1994 | Wu et al. |
| 5,340,309 A | 8/1994 | Robertson et al. |
| 5,342,202 A | 8/1994 | Deshayes et al. |
| 5,368,478 A | 11/1994 | Andreiko et al. |
| 5,382,164 A | 1/1995 | Stern et al. |
| 5,395,238 A | 3/1995 | Andreiko et al. |
| 5,431,562 A | 7/1995 | Andreiko et al. |
| 5,440,326 A | 8/1995 | Quinn et al. |
| 5,440,496 A | 8/1995 | Andersson et al. |
| 5,447,432 A | 9/1995 | Andreiko et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| RE35,169 E | 3/1996 | Lemchen et al. |
| 5,499,633 A | 3/1996 | Fenton et al. |
| 5,518,397 A | 5/1996 | Andreiko et al. |
| 5,528,735 A | 6/1996 | Strasnick et al. |
| 5,533,895 A | 7/1996 | Andreiko et al. |
| 5,542,842 A | 8/1996 | Andreiko et al. |
| 5,549,476 A | 8/1996 | Stern et al. |
| 5,562,448 A | 10/1996 | Mushabac et al. |
| 5,587,912 A | 12/1996 | Andersson et al. |
| 5,605,459 A | 2/1997 | Kuroda et al. |
| 5,607,305 A | 3/1997 | Andersson et al. |
| 5,614,075 A | 3/1997 | Andre, Sr. et al. |
| 5,621,648 A | 4/1997 | Crump et al. |
| 5,645,420 A | 7/1997 | Bergersen et al. |
| 5,645,421 A | 7/1997 | Slootsky et al. |
| 5,655,653 A | 8/1997 | Chester et al. |
| 5,683,243 A | 11/1997 | Andreiko et al. |
| 5,683,244 A | 11/1997 | Truax et al. |
| 5,692,894 A | 12/1997 | Schwartz et al. |
| 5,725,376 A | 3/1998 | Poirier et al. |
| 5,725,378 A | 3/1998 | Wang et al. |

(56) References Cited

U.S. PATENT DOCUMENTS

| | | |
|---|---|---|
| 5,733,126 A | 3/1998 | Andersson et al. |
| 5,740,267 A | 4/1998 | Echerer et al. |
| 5,742,700 A | 4/1998 | Yoon et al. |
| 5,794,627 A | 8/1998 | Frantz et al. |
| 5,799,100 A | 8/1998 | Clarke et al. |
| 5,800,174 A | 9/1998 | Andersson et al. |
| 5,823,778 A | 10/1998 | Schmitt et al. |
| 5,848,115 A | 12/1998 | Little et al. |
| 5,857,853 A | 1/1999 | van Nifterick et al. |
| 5,866,058 A | 2/1999 | Batchelder et al. |
| 5,879,158 A | 3/1999 | Doyle et al. |
| 5,880,961 A | 3/1999 | Crump et al. |
| 5,880,962 A | 3/1999 | Andersson et al. |
| 5,934,288 A | 8/1999 | Avila et al. |
| 5,957,686 A | 9/1999 | Anthony et al. |
| 5,964,587 A | 10/1999 | Sato et al. |
| 5,971,754 A | 10/1999 | Sondhi et al. |
| 5,975,893 A | 11/1999 | Chishti et al. |
| 6,015,289 A | 1/2000 | Andreiko et al. |
| 6,044,309 A | 3/2000 | Honda et al. |
| 6,049,743 A | 4/2000 | Baba et al. |
| 6,062,861 A | 5/2000 | Andersson |
| 6,068,482 A | 5/2000 | Snow et al. |
| 6,099,314 A | 8/2000 | Kopelman et al. |
| 6,123,544 A | 9/2000 | Cleary et al. |
| 6,152,731 A | 11/2000 | Jordan et al. |
| 6,183,248 B1 | 2/2001 | Chishti et al. |
| 6,190,165 B1 | 2/2001 | Andreiko et al. |
| 6,200,133 B1 | 3/2001 | Kittelsen et al. |
| 6,217,325 B1 | 4/2001 | Chishti et al. |
| 6,217,334 B1 | 4/2001 | Hultgren et al. |
| 6,244,861 B1 | 6/2001 | Andreiko et al. |
| 6,309,215 B1 | 10/2001 | Phan et al. |
| 6,315,553 B1 | 11/2001 | Sachdeva et al. |
| 6,322,359 B1 | 11/2001 | Jordan et al. |
| 6,350,120 B1 | 2/2002 | Sachdeva et al. |
| 6,382,975 B1 | 5/2002 | Poirier et al. |
| 6,398,548 B1 | 6/2002 | Muhammad et al. |
| 6,402,707 B1 | 6/2002 | Ernst et al. |
| 6,405,729 B1 | 6/2002 | Thornton et al. |
| 6,450,807 B1 | 9/2002 | Chishti et al. |
| 6,482,298 B1 | 11/2002 | Bhatnagar et al. |
| 6,516,805 B1 | 2/2003 | Thornton et al. |
| 6,524,101 B1 | 2/2003 | Phan et al. |
| 6,554,611 B2 | 4/2003 | Shishti et al. |
| 6,572,372 B1 | 6/2003 | Phan et al. |
| 6,604,527 B1 | 8/2003 | Palmisano |
| 6,629,840 B2 | 10/2003 | Chishti et al. |
| 6,705,863 B2 | 3/2004 | Phan et al. |
| 6,722,880 B2 | 4/2004 | Chishti et al. |
| 6,749,414 B1 | 6/2004 | Hanson et al. |
| 6,830,450 B2 | 12/2004 | Knopp et al. |
| 7,226,287 B2 | 6/2007 | Abels et al. |
| 7,293,987 B2 | 11/2007 | Abels et al. |
| 7,357,637 B2 | 4/2008 | Liechtung et al. |
| 7,637,262 B2 | 12/2009 | Bailey et al. |
| 7,892,474 B2 | 2/2011 | Shkolnik et al. |
| 8,001,973 B2 | 8/2011 | Sotos et al. |
| 8,013,853 B1 | 9/2011 | Douglas et al. |
| 8,025,063 B2 | 9/2011 | Sotos et al. |
| 8,037,886 B2 | 10/2011 | Sotos et al. |
| 8,215,312 B2 | 7/2012 | Garabadian et al. |
| 8,297,286 B2 | 10/2012 | Smernoff et al. |
| 8,449,296 B2 | 5/2013 | Liechtung et al. |
| 8,573,224 B2 | 11/2013 | Thornton et al. |
| 8,839,793 B2 | 9/2014 | Diaz |
| 8,870,566 B2 | 10/2014 | Bergersen et al. |
| 9,545,331 B2 | 1/2017 | Ingemarsson-Matzen et al. |
| 9,744,006 B2 | 8/2017 | Ross et al. |
| 9,844,424 B2 | 12/2017 | Wu et al. |
| 10,299,894 B2 | 5/2019 | Tanugula et al. |
| 2002/0006597 A1 | 1/2002 | Andreiko et al. |
| 2003/0009252 A1 | 1/2003 | Pavlovskaia et al. |
| 2003/0031976 A1 | 2/2003 | Clark |
| 2003/0075186 A1 | 4/2003 | Florman |
| 2003/0139834 A1 | 7/2003 | Nikolskiy et al. |
| 2003/0207224 A1 | 11/2003 | Lotte et al. |
| 2003/0224311 A1 | 12/2003 | Cronauer et al. |
| 2003/0224313 A1 | 12/2003 | Bergersen |
| 2004/0009449 A1 | 1/2004 | Mah et al. |
| 2004/0058295 A1 | 3/2004 | Bergersen et al. |
| 2004/0128010 A1 | 7/2004 | Pavlovskaia et al. |
| 2004/0209218 A1 | 10/2004 | Chishti et al. |
| 2005/0055118 A1 | 3/2005 | Nikolskiy et al. |
| 2005/0136371 A1 | 6/2005 | Abolfathi et al. |
| 2005/0244781 A1 | 11/2005 | Abels et al. |
| 2006/0008760 A1 | 1/2006 | Phan et al. |
| 2006/0078840 A1 | 4/2006 | Robson |
| 2006/0099546 A1 | 5/2006 | Bergersen et al. |
| 2007/0092850 A1 | 4/2007 | Kaza |
| 2008/0020337 A1 | 1/2008 | Phan et al. |
| 2008/0057466 A1 | 3/2008 | Jordan et al. |
| 2008/0115791 A1 | 5/2008 | Heine et al. |
| 2008/0268400 A1 | 10/2008 | Moss et al. |
| 2009/0032030 A1 | 2/2009 | Callender et al. |
| 2009/0068617 A1 | 3/2009 | Auren |
| 2010/0138025 A1 | 6/2010 | Morton et al. |
| 2011/0005527 A1 | 1/2011 | Andrew et al. |
| 2011/0184762 A1 | 7/2011 | Chishti et al. |
| 2012/0295211 A1 | 11/2012 | Frantz et al. |
| 2013/0089828 A1 | 4/2013 | Borovinskih et al. |
| 2013/0095446 A1 | 4/2013 | Andreiko et al. |
| 2013/0122448 A1 | 5/2013 | Kitching et al. |
| 2013/0160776 A1 | 6/2013 | Petelle et al. |
| 2013/0204583 A1 | 8/2013 | Matov et al. |
| 2013/0297275 A1 | 11/2013 | Sanchez et al. |
| 2013/0317800 A1 | 11/2013 | Wu et al. |
| 2014/0060549 A1 | 3/2014 | Lucas |
| 2014/0061974 A1 | 3/2014 | Tyler et al. |
| 2014/0120490 A1* | 5/2014 | Borovinskih ............ A61C 7/36 433/6 |
| 2014/0142897 A1 | 5/2014 | Kuo |
| 2014/0265034 A1 | 9/2014 | Dudley et al. |
| 2014/0370465 A1 | 12/2014 | Lucas et al. |
| 2015/0097315 A1 | 4/2015 | Desimone et al. |
| 2015/0097316 A1 | 4/2015 | Desimone et al. |
| 2015/0102532 A1 | 4/2015 | Desimone et al. |
| 2015/0157423 A1 | 6/2015 | Muslin |
| 2015/0238280 A1 | 8/2015 | Wu et al. |
| 2015/0238283 A1 | 8/2015 | Tanugula et al. |
| 2015/0238284 A1 | 8/2015 | Wu et al. |
| 2016/0106521 A1 | 4/2016 | Tanugula et al. |
| 2016/0128803 A1* | 5/2016 | Webber .................... A61C 7/36 433/6 |
| 2016/0199216 A1* | 7/2016 | Cam ...................... A61C 7/002 128/848 |
| 2016/0361139 A1 | 12/2016 | Webber et al. |
| 2017/0007363 A1 | 1/2017 | Boronkay |
| 2017/0007386 A1 | 1/2017 | Mason et al. |
| 2017/0035533 A1 | 2/2017 | Ross |
| 2018/0132975 A1 | 5/2018 | Wu et al. |
| 2018/0147028 A1* | 5/2018 | Warshawsky ............ A61C 7/08 |
| 2018/0368944 A1 | 12/2018 | Sato et al. |
| 2019/0021817 A1 | 1/2019 | Sato et al. |

FOREIGN PATENT DOCUMENTS

| | | |
|---|---|---|
| AU | 5598894 A | 6/1994 |
| CA | 1121955 A | 4/1982 |
| CN | 105997274 A | 10/2016 |
| DE | 2749802 A1 | 5/1978 |
| DE | 69327661 T2 | 7/2000 |
| DE | 102004007008 A1 | 9/2005 |
| DE | 202010017014 U1 | 2/2011 |
| DE | 102012005323 A1 | 9/2013 |
| EP | 0091876 A1 | 10/1983 |
| EP | 0299490 A2 | 1/1989 |
| EP | 0376873 A2 | 7/1990 |
| EP | 0428152 A1 | 5/1991 |
| EP | 0490848 A2 | 6/1992 |
| EP | 0541500 A1 | 5/1993 |
| EP | 0667753 B1 | 1/2000 |
| EP | 0774933 B1 | 12/2000 |
| EP | 0731673 B1 | 5/2001 |

(56) References Cited

FOREIGN PATENT DOCUMENTS

| | | | |
|---|---|---|---|
| EP | 1094761 B1 | 10/2008 | |
| ES | 463897 A1 | 1/1980 | |
| ES | 2455066 A1 | 4/2014 | |
| FR | 2369828 A1 | 6/1978 | |
| FR | 2652256 A1 | 3/1991 | |
| GB | 1550777 A | 8/1979 | |
| JP | S5358191 A | 5/1978 | |
| JP | H0428359 A | 1/1992 | |
| JP | H08508174 A | 9/1996 | |
| JP | 2005161081 A | 6/2005 | |
| JP | 4184427 B1 | 11/2008 | |
| JP | 2010528748 A | 8/2010 | |
| JP | 2011500142 A | 1/2011 | |
| JP | 2011120928 A | 6/2011 | |
| KR | 20130111848 A | 10/2013 | |
| WO | WO-9008512 A1 | 8/1990 | |
| WO | WO-9104713 A1 | 4/1991 | |
| WO | WO-9410935 A1 | 5/1994 | |
| WO | WO-9832394 A1 | 7/1998 | |
| WO | WO-9844865 A1 | 10/1998 | |
| WO | WO-9858596 A1 | 12/1998 | |
| WO | WO-0170126 A2 | 9/2001 | |
| WO | WO-0180762 A2 | 11/2001 | |
| WO | WO-02062252 A1 | 8/2002 | |
| WO | 2010087824 A1 | 8/2010 | |
| WO | WO-2011126854 A2 * | 10/2011 | ............... A61C 7/36 |
| WO | WO-2012140021 A2 | 10/2012 | |
| WO | WO-2013102095 A1 | 7/2013 | |
| WO | WO-2014060595 A1 | 4/2014 | |
| WO | WO-2019069163 A1 * | 4/2019 | ............. G06F 30/10 |

OTHER PUBLICATIONS

Bite Ramps. Align Orthodontics. http://www.alignortho.com/Portals/0/pdf/BITE%20RAMPS.pdf. Sep. 17, 2010. Retrieved on or before Sep. 19, 2014.
Dr. Jonathan Nicozisis. Techniques for Deep Bite Correction with Invisalign. Clinical Tips & Techniques. Jun. 2012. http://www.princetonorthodontics.net/Portals/0/Nicozisis_DeepBiteCorrection_Invisalign_new0628.pdf.
Dr. William V. Gierie. Techniques for Deep Bite Correction with Invisalign Virtual Bite Ramps. Clinical Tips & Techniques. Jun. 2012.
International search report with written opinion dated Feb. 20, 2017 for PCT/IB2016/057109.
International search report with written opinion dated Dec. 7, 2015 for PCT/IB2015/001655.
"Leonardo Tavares Camardella, et al. Use of a Bite Ramp in Orthodontic Treatment. Apresentado no A.A.O.—Scientific Posters Exhibit N 41-7 de maio de 2006. http://www.cleber.com.br/leonardo/."
Co-pending U.S. Appl. No. 16/745,980, filed Jan. 17, 2020.
"Mathematical Modeling Discussion of Optimal Design", vol. 25, No. 3, Journal of Jiangxi Vocational and Technical College of Electricity (2012) 4 pages.
Co-pending U.S. Application No. 202117150740, inventors Tanugula; Rohit et al., filed on Jan. 15, 2021.
MicrO2 TM., "Sleep and Snore Device", Easier for You and Your Patients to Sleep Well, Microdental Dublin/CA Laboratory, 2014, 1 page.
Resmed., Narvel CC—Gallery, Accessed from: http://www.resmed.com/in/products/narval_cc/image-gallery.html?nc=patients&sec=true on Sep. 2014, 1 page.
Respire Medical., Breathe Easy Again, The Respire Blue Series, Retrieved from: http://www.respiremedical.com/respire-blue-series.html on Sep. 2014, 2 pages.
Sequim Smile the Family Dentistry, Accessed from: http://www.sequimsmiles.com/snoring-sleep-apnea/ on Sep. 2014. 6 pages.
Somnomed., "The leader in Continuous Open Airway Therapy (COAT)", SomnoDent Product Information, Retrieved from: http://somnomed.com/dentists/somnodent-product-information/ on Sep. 2014, 4 pages.
The Moses., "3-Dimensional Oral Appliance", Accessed from: http://themoses.com/features/ on Sep. 2014, 2 pages.
Zquiet Pro-Plus, For Patients, Retrieved from http://www.zquietproplus.com/patients.aspx on Sep. 2014, 4 pages.
AADR. American Association for Dental Research, Summary of Activities, Mar. 20-23, 1980, Los Angeles, CA, p. 195.
Alcaniz, et al., "An Advanced System for the Simulation and Planning of Orthodontic Treatments," Karl Heinz Hohne and Ron Kikinis (eds.), Visualization in Biomedical Computing, 4th Intl. Conf., VBC '96, Hamburg, Germany, Sep. 22-25, 1996, Springer-Verlag, pp. 511-520.
Alexander et al., "The DigiGraph Work Station Part 2 Clinical Management," JCO, pp. 402-407 (Jul. 1990).
Altschuler, "3D Mapping of Maxillo-Facial Prosthesis," AADR Abstract #607, 2 pages total, (1980).
Altschuler et al., "Analysis of 3-D Data for Comparative 3-D Serial Growth Pattern Studies of Oral-Facial Structures," IADR Abstracts, Program and Abstracts of Papers, 57th General Session, IADR Annual Session, Mar. 29, 1979-Apr. 1, 1979, New Orleans Marriot, Journal of Dental Research, vol. 58, Jan. 1979, Special Issue A, p. 221.
Altschuler et al., "Laser Electro-Optic System for Rapid Three-Dimensional (3D) Topographic Mapping of Surfaces," Optical Engineering, 20(6):953-961 (1981).
Altschuler et al., "Measuring Surfaces Space-Coded by a Laser-Projected Dot Matrix," SPIE Imaging Applications for Automated Industrial Inspection and Assembly, vol. 182, p. 187-191 (1979).
Andersson et al., "Clinical Results with Titanium Crowns Fabricated with Machine Duplication and Spark Erosion," Acta. Odontol. Scand., 47:279-286 (1989).
Andrews, The Six Keys to Optimal Occlusion Straight Wire, Chapter 3, pp. 13-24 (1989).
Bartels, et al., An Introduction to Splines for Use in Computer Graphics and Geometric Modeling, Morgan Kaufmann Publishers, pp. 422-425 (1987).
Baumrind, "A System for Craniofacial Mapping Through the Integration of Data from Stereo X-Ray Films and Stereo Photographs," an invited paper submitted to the 1975 American Society of Photogram Symposium on Close-Range Photogram Systems, University of Ill., Aug. 26-30, 1975, pp. 142-166.
Baumrind et al., "A Stereophotogrammetric System for the Detection of Prosthesis Loosening in Total Hip Arthroplasty, NATO Symposium on Applications of Human Biostereometrics," Jul. 9-13, 1978, SPIE, vol. 166, pp. 112-123.
Baumrind et al., "Mapping the Skull in 3-D," reprinted from J. Calif. Dent. Assoc., 48(2), 11 pages total, (1972 Fall Issue).
Baumrind, "Integrated Three-Dimensional Craniofacial Mapping: Background, Principles, and Perspectives," Semin. in Orthod., 7(4):223-232 (Dec. 2001).
Begole et al., "A Computer System for the Analysis of Dental Casts," The Angle Orthod., 51(3):253-259 (Jul. 1981).
Bernard et al.,"Computerized Diagnosis in Orthodontics for Epidemiological Studies: A Progress Report," Abstract, J. Dental Res. Special Issue, vol. 67, p. 169, paper presented at International Association for Dental Research 66th General Session, Mar. 9-13, 1988, Montreal, Canada.
Bhatia et al., "A Computer-Aided Design for Orthognathic Surgery," Br. J. Oral Maxillofac. Surg., 22:237-253 (1984).
Biggerstaff, "Computerized Diagnostic Setups and Simulations," Angle Orthod., 40(1):28-36 (Jan. 1970).
Biggerstaff et al., "Computerized Analysis of Occlusion in the Postcanine Dentition," Am. J. Orthod., 61(3): 245-254 (Mar. 1972).
Biostar Opeation & Training Manual. Great Lakes Orthodontics, Ltd. 199 Fire Tower Drive, Tonawanda, New York. 14150-5890, 20 pages total (1990).
Blu, et al., "Linear interpolation revitalized", IEEE Trans. Image Proc., 13(5):710-719 (May 2004.
Bourke, "Coordinate System Transformation," (Jun. 1996), p. 1, retrieved from the Internet Nov. 5, 2004, URL< http://astronomy.swin.edu.au/-pbourke/prolection/coords>.
Boyd et al., "Three Dimensional Diagnosis and Orthodontic Treatment of Complex Malocclusions With the Invisalipn Appliance," Semin. Orthod., 7(4):274-293 (Dec. 2001).

(56) References Cited

OTHER PUBLICATIONS

Brandestini et al., "Computer Machined Ceramic Inlays: In Vitro Marginal Adaptation," J. Dent. Res. Special Issue, Abstract 305, vol. 64, p. 208 (1985).

Brook et al., "An Image Analysis System for the Determination of Tooth Dimensions from Study Casts: Comparison with Manual Measurements of Mesio-distal Diameter," J. Dent. Res., 65(3):428-431 (Mar. 1986).

Burstone et al., Precision Adjustment of the Transpalatal Lingual Arch: Computer Arch Form IN Predetermination, Am, Journal of Orthodontics, vol. 79, No. 2 (Feb. 1981), pp. 115-133.

Burstone (interview), "Dr. Charles J. Burstone on The Uses of the Computer in Orthodontic Practice (Part 1)," J. Clin. Orthod., 13(7):442-453 (Jul. 1979).

Burstone (interview), "Dr. Charles J. Burstone on The Uses of the Computer in Orthodontic Practice (Part 2)," J. Clin. Orthod., 13(8):539-551 (Aug. 1979).

Cardinal Industrial Finishes, Powder Coatings information posted at< http://www.cardinalpaint.com> on Aug. 25, 2000, 2 pages.

Carnaghan, "An Alternative to Holograms for the Portrayal of Human Teeth," 4th Int'l. Conf. on Holographic Systems, Components and Applications, Sep. 15, 1993, pp. 228-231.

Chaconas et al., "The DigiGraph Work Station, Part 1, Basic Concepts," JCO, pp. 360-367 (Jun. 1990).

Chafetz et al., "Subsidence of the Femoral Prosthesis, A Stereophotogrammetric Evaluation," Clin. Orthop. Relat. Res., No. 201, pp. 60-67 (Dec. 1985).

Chiappone, (1980). Constructing the Gnathologic Setup and Positioner, J. Clin. Orthod, vol. 14, pp. 121-133.

Cottingham, (1969). Gnathologic Clear Plastic Positioner, Am. J. Orthod, vol. 55, pp. 23-31.

Crawford, "CAD/CAM in the Dental Office: Does It Work?", Canadian Dental Journal, vol. 57, No. 2, pp. 121-123 (Feb. 1991).

Crawford, "Computers in Dentistry: Part 1 CAD/CAM: The Computer Moves Chairside," Part 2 F. Duret —A Man with a Vision,"Part 3 The Computer Gives New Vision—Literally, Part 4 Bytes 'N Bites—The Computer Moves from the Front Desk to the Operatory," Canadian Dental Journal, vol. 54 (9), pp. 661-666 (1988).

Crooks, "CAD/CAM Comes to USC," USC Dentistry, pp. 14-17 (Spring 1990).

Cureton, Correcting Malaligned Mandibular Incisors with Removable Retainers, J. Clin. Orthod, vol. 30, No. 7 (1996) pp. 390-395.

Curry et al., "Integrated Three-Dimensional Craniofacial Mapping at the Craniofacial Research Instrumentation Laboratory/University of the Pacific," Semin. Orthod., 7(4):258-265 (Dec. 2001).

Cutting et a/., "Three-Dimensional Computer-Assisted Design of Craniofacial Surgical Procedures: Optimization and Interaction with Cephalometric and CT-Based Models," Plast. 77(6):877-885 (Jun. 1986).

DCS Dental AG, "The CAD/CAM 'DCS Titan System' for Production of Crowns/Bridges," DSC Production AG, pp. 1-7 (Jan. 1992).

Definition for gingiva. Dictionary.com p. 1-3. Retrieved from the internet Nov. 5, 2004< http://reference.com/search/search?q=gingiva>.

Defranco et al., "Three-Dimensional Large Displacement Analysis of Orthodontic Appliances," J. Biomechanics, 9:793-801 (1976).

Dental Institute University of Zurich Switzerland, Program for International Symposium JD on Computer Restorations: State of the Art of the CEREC—Method, May 1991, 2 pages total.

Dentrac Corporation, Dentrac document, pp. 4-13 (1992).

DENT-X posted on Sep. 24, 1998 at< http://www.dent-x.com/DentSim.htm>, 6 pages.

Doyle, "Digital Dentistry," Computer Graphics World, pp. 50-52, 54 (Oct. 2000).

DuraClearTM product information, Allesee Orthodontic Appliances—Pro Lab, 1 page (1997).

Duret et al., "CAD/CAM Imaging in Dentistry," Curr. Opin. Dent., 1:150-154 (1991).

Duret et al., "CAD-CAM in Dentistry," J. Am. Dent. Assoc. 117:715-720 (Nov. 1988).

Duret, "The Dental CAD/CAM, General Description of the Project," Hennson International Product Brochure, 18 pages total, Jan. 1986.

Duret,"Vers Une Prosthese Informatisee," (English translation attached), Tonus, vol. 75, pp. 55-57 (Nov. 15, 1985).

Economides, "The Microcomputer in the Orthodontic Office," JCO, pp. 767-772 (Nov. 1979).

Elsasser, Some Observations on the History and Uses of the Kesling Positioner, Am. J. Orthod. (1950) 36:368-374.

English translation of Japanese Laid-Open Publication No. 63-11148 to inventor T. Ozukuri (Laid-Open on Jan. 18, 1998) pp. 1-7.

Felton et al., "A Computerized Analysis of the Shape and Stability of Mandibular Arch Form," Am. J. Orthod. Dentofacial Orthop., 92(6):478-483 (Dec. 1987).

Friede et al., "Accuracy of Cephalometric Prediction in Orthognathic Surgery," Abstract of Papers, J. Dent. Res., 70:754-760 (1987).

Futterling et a/., "Automated Finite Element Modeling of a Human Mandible with Dental Implants," JS WSCG '98—Conference Program, retrieved from the Internet:< http://wscg.zcu.cz/wscg98/papers98/Strasser 98.pdf>, 8 pages.

Gao et al., "3-D element Generation for Multi-Connected Complex Dental and Mandibular Structure," Proc. Intl Workshop on Medical Imaging and Augmented Reality, pp. 267-271 (Jun. 12, 2001).

Gim-Alldent Deutschland, "Das DUX System: Die Technik," 2 pages total (2002).

Gottleib et al., "JCO Interviews Dr. James A. McNamara, Jr., on the Frankel Appliance: Part 2: Clinical 1-1 Management,"J. Clin. Orthod., 16(6):390-407 (Jun. 1982).

Grayson, "New Methods for Three Dimensional Analysis of Craniofacial Deformity, Symposium: JW Computerized Facial Imaging in Oral and Maxiiofacial Surgery," AAOMS, 3 pages total, (Sep. 13, 1990).

Guess et al., "Computer Treatment Estimates In Orthodontics and Orthognathic Surgery," JCO, pp. 262-228 (Apr. 1989).

Heaven et a/., "Computer-Based Image Analysis of Artificial Root Surface Caries, Abstracts of Papers," J. Dent. Res., 70:528 (Apr. 17-21, 1991).

Highbeam Research, "Simulating Stress Put on Jaw," Tooling & Production [online], Nov. 1996, n pp. 1-2, retrieved from the Internet on Nov. 5, 2004, URL http://static.highbeam.com/t/toolingampproduction/november011996/simulatingstressput-onfa...>.

Hikage, "Integrated Orthodontic Management System for Virtual Three-Dimensional Computer Graphic Simulation and Optical Video Image Database for Diagnosis and Treatment Planning", Journal of Japan KA Orthodontic Society, Feb. 1987, English translation, pp. 1-38, Japanese version, 46(2), pp. 248-269 (60 pages total).

Hoffmann, et al., "Role of Cephalometry for Planning of Jaw Orthopedics and Jaw Surgery Procedures," (Article Summary in English, article in German), Informatbnen, pp. 375-396 (Mar. 1991).

Hojjatie et al., "Three-Dimensional Finite Element Analysis of Glass-Ceramic Dental Crowns," J. Biomech., 23(11):1157-1166 (1990).

Huckins, "CAD-CAM Generated Mandibular Model Prototype from MRI Data," AAOMS, p. 96 (1999).

Important Tip About Wearing the Red White & Blue Active Clear Retainer System, Allesee Orthodontic Appliances—Pro Lab, 1 page 1998).

International search report with written opinion dated Jan. 23, 2019 for PCT/US2018/058495.

JCO Interviews, Craig Andreiko, DDS, MS on the Elan and Orthos Systems, JCO, pp. 459-468 (Aug. 1994).

JCO Interviews, Dr. Homer W. Phillips on Computers in Orthodontic Practice, Part 2, JCO. 1997; 1983:819-831.

Jerrold, "The Problem, Electronic Data Transmission and the Law," AJO-DO, pp. 478-479 (Apr. 1988).

Jones et al., "An Assessment of the Fit of a Parabolic Curve to Pre- and Post-Treatment Dental Arches," Br. J. Orthod., 16:85-93 (1989).

JP Faber et al., "Computerized Interactive Orthodontic Treatment Planning," Am. J. Orthod., 73(1):36-46 (Jan. 1978).

(56) References Cited

OTHER PUBLICATIONS

Kamada et.al., Case Reports On Tooth Positioners Using LTV Vinyl Silicone Rubber, J. Nihon University School of Dentistry (1984) 26(1): 11-29.
Kamada et.al., Construction of Tooth Positioners with LTV Vinyl Silicone Rubber and Some Case KJ Reports, J. Nihon University School of Dentistry (1982) 24(1):1-27.
Kanazawa et al., "Three-Dimensional Measurements of the Occlusal Surfaces of Upper Molars in a Dutch Population," J. Dent Res., 63(11):1298-1301 (Nov. 1984).
Kesling, Coordinating the Predetermined Pattern and Tooth Positioner with Conventional Treatment, KN Am. J. Orthod. Oral Surg. (1946) 32:285-293.
Kesling et al., The Philosophy of the Tooth Positioning Appliance, American Journal of Orthodontics and Oral surgery. 1945; 31:297-304.
Kleeman et al., The Speed Positioner, J. Clin. Orthod. (1996) 30:673-680.
Kochanek, "Interpolating Splines with Local Tension, Continuity and Bias Control," Computer Graphics, ri 18(3):33-41 (Jul. 1984).
KM Oral Surgery (1945) 31 :297-30.
Kunii et al., "Articulation Simulation for an Intelligent Dental Care System," Displays 15:181-188 (1994).
Kuroda et al., Three-Dimensional Dental Cast Analyzing System Using Laser Scanning, Am. J. Orthod. Dentofac. Orthop. (1996) 110:365-369.
Laurendeau, et al., "A Computer-Vision Technique for the Acquisition and Processing of 3-D Profiles of 7 KR Dental Imprints: An Application in Orthodontics," IEEE Transactions on Medical Imaging, 10(3):453-461 (Sep. 1991.
Leinfelder, et al., "A New Method for Generating Ceramic Restorations: a CAD-CAM System," J. Am. 1-1 Dent. Assoc., 118(6):703-707 (Jun. 1989).
Manetti, et al., "Computer-Aided Cefalometry and New Mechanics in Orthodontics," (Article Summary in English, article in German), Fortschr Kieferorthop. 44, 370-376 (Nr. 5), 1983.
Mccann, "Inside the ADA," J. Amer. Dent. Assoc., 118:286-294 (Mar. 1989).
Mcnamara et al., "Invisible Retainers," J. Cfin. Orthod., pp. 570-578 (Aug. 1985).
Mcnamara et al., Orthodontic and Orthopedic Treatment in the Mixed Dentition, Needham Press, pp. 347-353 (Jan. 1993).
Moermann et al., "Computer Machined Adhesive Porcelain Inlays: Margin Adaptation after Fatigue Stress," IADR Abstract 339, J. Dent. Res., 66(a):763 (1987).
Moles, "Correcting Mild Malalignments—As Easy As One, Two, Three," AOA/Pro Corner, vol. 11, No. 1, 2 pages (2002).
Mormann et al., "Marginale Adaptation von adhasuven Porzellaninlays in vitro," Separatdruck aus: Schweiz. Mschr. Zahnmed. 95: 1118-1129, 1985.
Nahoum, "The Vacuum Formed Dental Contour Appliance," N. Y. State Dent. J., 30(9):385-390 (Nov. 1964).
Nash, "CEREC CAD/CAM Inlays: Aesthetics and Durability in a Single Appointment," Dent. Today, 9(8):20, Oct. 22-23, 1990.
Nishiyama et al., "A New Construction of Tooth Repositioner by LTV Vinyl Silicone Rubber," J. Nihon Univ. Sch. Dent., 19(2):93-102 (1977).
Paul et al., "Digital Documentation of Individual Human Jaw and Tooth Forms for Applications in Orthodontics, Oral Surgery and Forensic Medicine" Proc. of the 24th Annual Conf. of the IEEE Industrial Electronics Society (IECON '98), Sep. 4, 1998, pp. 2415-2418.
Pinkham, "Foolish Concept Propels Technology," Dentist, 3 pages total, Jan./Feb. 1989.
Pinkham, "Inventor's CAD/CAM May Transform Dentistry," Dentist, 3 pages total, Sep. 1990.
Ponitz, "Invisible Retainers," Am. J. Orthod., 59(3):266-272 (Mar. 1971).
Procera Research Projects, "Procera Research Projects 1993—Abstract Collection," pp. 3-7; 28 (1993).
Proffit et al., Contemporary Orthodontics, (Second Ed.), Chapter 15, Mosby Inc., pp. 470-533 (Oct. 1993.
Raintree Essix & ARS Materials, Inc., Raintree Essix, Technical Magazine Table of contents and Essix Appliances,< http://www.essix.com/magazine/defaulthtml> Aug. 13, 1997.
Redmond et al., "Clinical Implications of Digital Orthodontics," Am. J. Orthod. Dentofacial Orthop., 117(2):240-242 (2000).
Rekow, "A Review of the Developments in Dental CAD/CAM Systems," (contains references to Japanese efforts and content of the papers of particular interest to the clinician are indicated with a one line summary of their content in the bibliography), Curr. Opin. Dent., 2:25-33 (Jun. 1992).
Rekow, "CAD/CAM in Dentistry: A Historical Perspective and View of the Future," J. Can. Dent. Assoc., 58(4):283, 287-288 (Apr. 1992).
Rekow, "Computer-Aided Design and Manufacturing in Dentistry: A Review of the State of the Art," J. Prosthet. Dent., 58(4):512-516 (Oct. 1987).
Rekow, "Dental CAD-CAM Systems: What is the State of the Art?", J. Amer. Dent. Assoc., 122:43-48 1991.
Rekow et al., "CAD/CAM for Dental Restorations—Some of the Curious Challenges," IEEE Trans. Biomed. Eng., 38(4):314-318 (Apr. 1991).
Rekow et al., "Comparison of Three Data Acquisition Techniques for 3-D Tooth Surface Mapping," Annual International Conference of the IEEE Engineering in Medicine and Biology Society, 13(1):344-345 1991.
Rekow, "Feasibility of an Automated System for Production of Dental Restorations, Ph.D. Thesis," Univ. of Minnesota, 244 pages total, Nov. 1988.
Richmond et al., "The Development of a 3D Cast Analysis System," Br. J. Orthod., 13(1):53-54 (Jan. 1986).
Richmond et al., "The Development of the PAR Index (Peer Assessment Rating): Reliability and Validity," Eur. J. Orthod., 14:125-139 (1992).
Richmond, "Recording The Dental Cast In Three Dimensions," Am. J. Orthod. Dentofacial Orthop., 92(3):199-206 (Sep. 1987).
Rudge, "Dental Arch Analysis: Arch Form, A Review of the Literature," Eur. J. Orthod., 3(4):279-284 1981.
Sakuda et al., "Integrated Information-Processing System In Clinical Orthodontics: An Approach with Use of a Computer Network System," Am. J. Orthod. Dentofacial Orthop., 101(3): 210-220 (Mar. 1992).
Schellhas et al., "Three-Dimensional Computed Tomography in Maxillofacial Surgical Planning," Arch. Otolampl. Head Neck Sur9., 114:438-442 (Apr. 1988).
Schroeder et al., Eds. The Visual Toolkit, Prentice Hall PTR, New Jersey (1998) Chapters 6, 8 & 9, (pp. 153-210,309-354, and 355-428, respectively.
Shilliday, (1971). Minimizing finishing problems with the mini-positioner, Am. J. Orthod. 59:596-599.
Siemens, "CEREC—Computer-Reconstruction," High Tech in der Zahnmedizin, 14 pages total (2004).
Sinclair, "The Readers' Corner," J. Clin. Orthod., 26(6):369-372 (Jun. 1992).
Sirona Dental Systems GmbH, CEREC 3D, Manuel utiiisateur, Version 2.0X (in French), 2003, 114 pages total.
Stoll et al., "Computer-aided Technologies in Dentistry," (article summary in English, article in German), Dtsch Zahna'rztl Z 45, pp. 314-322 (1990).
Sturman, "Interactive Keyframe Animation of 3-D Articulated Models," Proceedings Graphics Interface '84, May-Jun. 1984, pp. 35-40.
The Choice Is Clear: Red, White & Blue . . . The Simple, Affordable, No Braces Treatment, Allesee HI Orthodontic Appliances—Pro Lab product information for doctors. http://ormco.com/aoa/appliancesservices/RWB/doctorhtml>, 5 pages (May 19, 2003).
The Choice is Clear: Red, White & Blue . . . The Simple, Affordable, No Braces Treatment, Allesee HJ Orthodontic Appliances—Pro Lab product information for patients,< http://ormco.com/aoa/appliancesservices/RWB/patients.html>, 2 pages (May 19, 2003).

(56) References Cited

OTHER PUBLICATIONS

The Choice Is Clear: Red, White & Blue . . . The Simple, Affordable, No-Braces Treatment, Allesee Orthodontic Appliances—Pro Lab product information, 6 pages (2003).
The Red, White & Blue Way to Improve Your Smile! Allesee Orthodontic Appliances—Pro Lab product information for patients, 2 pages 1992.
Truax L., "Truax Clasp-Less(TM) Appliance System," Funct. Orthod., 9(5):22-4, 26-8 (Sep.-Oct. 1992).
Tru-Tain Orthodontic & Dental Supplies, Product Brochure, Rochester, Minnesota 55902, 16 pages total (1996).
U.S. Department of Commerce, National Technical Information Service, "Automated Crown Replication Using Solid Photography SM," Solid Photography Inc., Melville NY, Oct. 1977, 20 pages total.
U.S. Department of Commerce, National Technical Information Service, "Holodontography: An Introduction to Dental Laser Holography," School of Aerospace Medicine Brooks AFB Tex, Mar. 1973, 37 pages total.
U.S. Appl. No. 60/050,342, filed Jun. 20, 1997, 41 pages total.
Van Der Linden, "A New Method to Determine Tooth Positions and Dental Arch Dimensions," J. Dent. Res., 51(4):1104 (Jul.-Aug. 1972).
Van Der Linden et al., "Three-Dimensional Analysis of Dental Casts by Means of the Optocom," J. Dent. Res., p. 1100 (Jul.-Aug. 1972).
Van Der Zel, "Ceramic-Fused-to-Metal.Restorations with a New CAD/CAM System," Quintessence Int., 24(11):769-778 (1993.
Varady et al., "Reverse Engineering Of Geometric Models—An Introduction," Computer-Aided Design, 29(4):255-268,1997.
Verstreken et al., "An Image-Guided Planning System for Endosseous Oral Implants," IEEE Trans. Med. Imaging, 17(5):842-852 (Oct. 1998).
Warunek et al., Physical and Mechanical Properties of Elastomers in Orthodonic Positioners, Am J. Orthod. Dentofac. Orthop, vol. 95, No. 5, (May 1989) pp. 399-400.
Warunek et.al., Clinical Use of Silicone Elastomer Applicances, JCO (1989) XXIII(10):694-700.
Wells, Application of the Positioner Appliance in Orthodontic Treatment, Am. J. Orthodont. (1970) 58:351-366.
Williams, "Dentistry and CAD/CAM: Another French Revolution," J. Dent. Practice Admin., pp. 2-5 (Jan./Mar. 1987).
Williams, "The Switzerland and Minnesota Developments in CAD/CAM," J. Dent. Practice Admin., pp. 50-55 (Apr./Jun. 1987.
Wishan, "New Advances in Personal Computer Applications for Cephalometric Analysis, Growth Prediction, Surgical Treatment Planning and Imaging Processing," Symposium: Computerized Facial Imaging in Oral and Maxilofacial Surgery Presented on Sep. 13, 1990.
WSCG'98—Conference Program, "The Sixth International Conference in Central Europe on Computer Graphics and Visualization '98," Feb. 9-13, 1998, pp. 1-7, retrieved from the Internet on Nov. 5, 2004, URL<http://wscg.zcu.cz/wscg98/wscg98.h>.
Xia et al., "Three-Dimensional Virtual-Reality Surgical Planning and Soft-Tissue Prediction for Orthognathic Surgery," IEEE Trans. Inf. Technol. Biomed., 5(2):97-1 07 (Jun. 2001).
Yamamoto et al., "Optical Measurement of Dental Cast Profile and Application to Analysis of Three-Dimensional Tooth Movement in Orthodontics," Front. Med. Biol. Eng., 1(2):119-130 (1988).
Yamamoto et al., "Three-Dimensional Measurement of Dental Cast Profiles and Its Applications to Orthodontics," Conf. Proc. IEEE Eng. Med. Biol. Soc., 12(5):2051-2053 (1990).
Yamany et al., "A System for Human Jaw Modeling Using Intra-Oral Images," Proc. of the 20th Annual Conf. of the IEEE Engineering in Medicine and Biology Society, Nov. 1, 1998, vol. 2, pp. 563-566.
Yoshii, "Research on a New Orthodontic Appliance: The Dynamic Positioner (D.P.); I. The D.P. Concept and Implementation of Transparent Silicone Resin (Orthocon)," Nippon Dental Review, 452:61-74 (Jun. 1980).
Yoshii, "Research on a New Orthodontic Appliance: The Dynamic Positioner (D.P.); II. The D.P. Manufacturing Procedure and Clinical Applications," Nippon Dental Review, 454:107-130 (Aug. 1980).
Yoshii, "Research on a New Orthodontic Appliance: The Dynamic Positioner (D.P.); III. The General Concept of the D.P. Method and Its Therapeutic Effect, Part 1, Dental and Functional Reversed Occlusion Case Reports," Nippon Dental Review, 457:146-164 (Nov. 1980).
Yoshii, "Research on a New Orthodontic Appliance: The Dynamic Positioner (D.P.); III.—The General Concept of the D.P. Method and Its Therapeutic Effect, Part 2. Skeletal Reversed Occlusion Case Reports," Nippon Dental Review, 458:112-129 (Dec. 1980).
You May Be A Candidate For This Invisible No-Braces Treatment, Allesee Orthodontic Appliances—Pro Lab product information for patients, 2 pages (2002).

\* cited by examiner

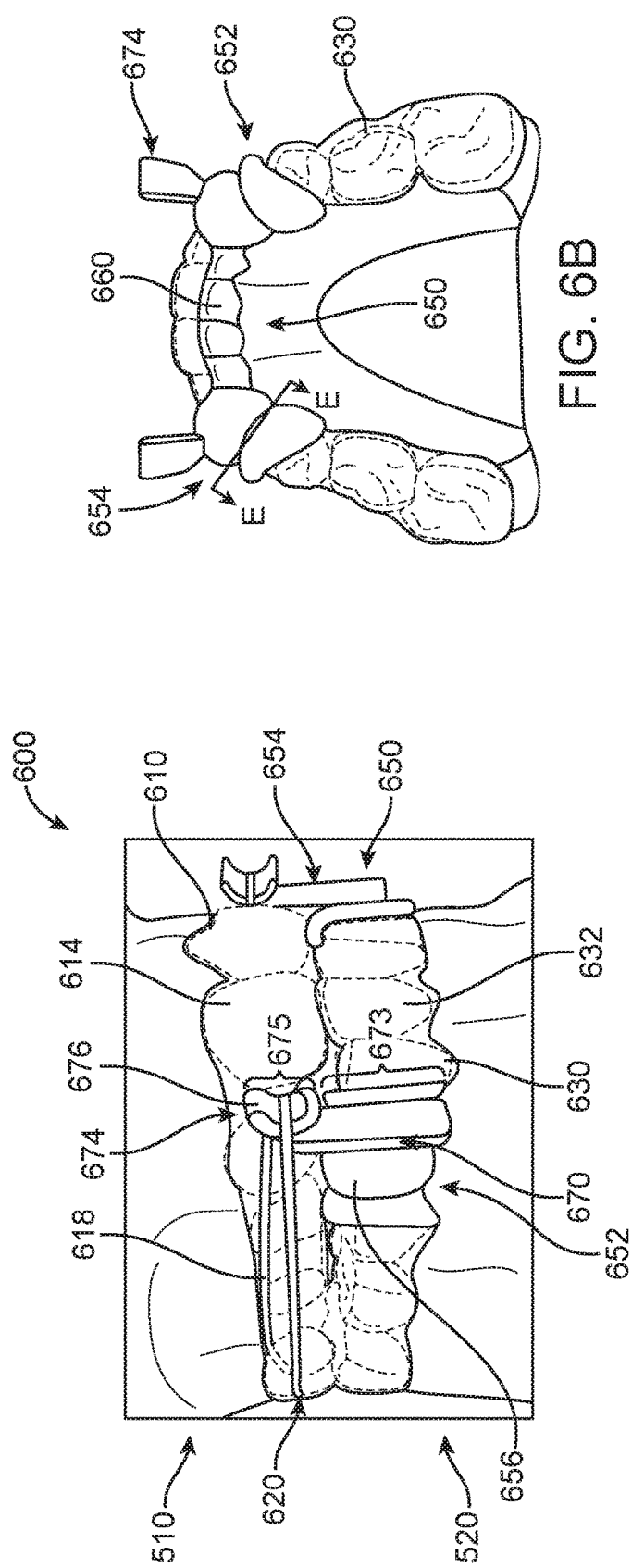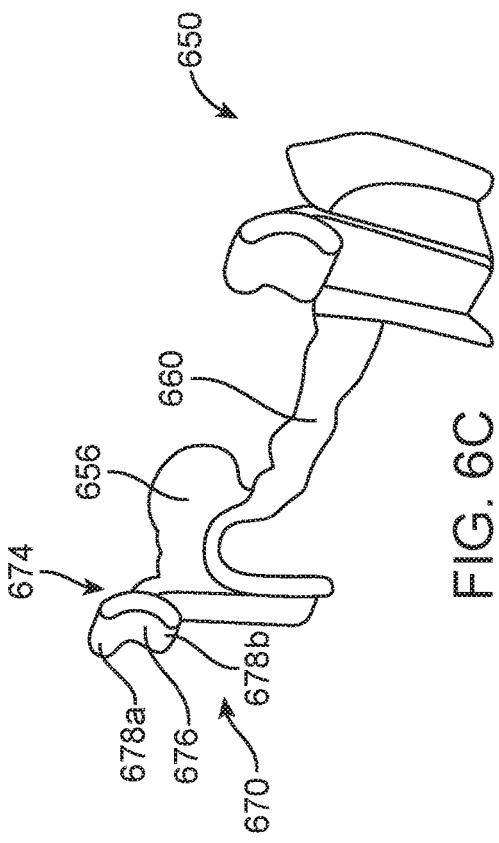

SYSTEMS AND METHODS FOR CORRECTING MALOCCLUSIONS OF TEETH

This application claims the benefit of U.S. Provisional Application No. 62/580,362, filed Nov. 1, 2017, which application is incorporated herein by reference.

BACKGROUND

In a class III malocclusion, the anterior teeth of the maxillary arch are posterior to the anterior teeth of the mandibular arch when the jaws are in a natural occlusion state. Class III malocclusions may also cause posterior teeth of the respective arches to have a cross bite malocclusion, such that the buccal cusp tips of posterior teeth of the upper arch rest inside the fossae of the lower teeth of the lower arch, instead of the cusp tips of the lower arch teeth resting inside the fossae of the teeth of the upper arch. Class III malocclusions may also be characterized by anterior cross bite, wherein the lower anterior teeth extend in front of (buccal to) the upper anterior teeth. Class III malocclusion causes an improper bite relationship between the teeth of the upper arch and the teeth of the lower arch. Class III and cross bite malocclusions may result in difficulty chewing and facial aesthetics that some people find undesirable. The systems described herein correct these and other malocclusions.

SUMMARY

A system for correcting malocclusions of a patient is disclosed. The system may include a maxillary appliance having tooth receiving cavities shaped to receive teeth of the maxilla and a first coupling a first distance above an occlusal plane of the patient for receiving an elastic. The system may also include a mandibular appliance having tooth receiving cavities shaped to receive teeth of the mandible. In some embodiments, the system includes a class III corrective appliance having a first mount shaped to engage with the mandibular arch of the patient and having a second coupling shaped to receive the elastic.

The system may also include a second mount shaped to engage with the mandibular arch of the patient, the first and second mounts shaped to engage with the mandibular arch of the patient at locations of respective first and second canines of the patient. In some embodiments, the system may also include a bridge extending between and connecting the first mount and the second mount, the bridge having a surface shaped to match a lingual facing anterior surface of the patient's mandibular arch. An arm may extend from the mount to a position above the occlusal surface of the mounts, the second coupling located at a terminal end of the arm and the second coupling may be the first distance above the occlusal plane of the patient.

In some embodiments the mount is shaped to engage with the mandibular arch of the patient at the central incisors and in some embodiments, the first coupling is located a first distance above the occlusal plane of the patient and the second coupling is located a second distance above the occlusal place of the patient, the first distance being equal to the second distance. The first coupling may be located a first distance above the occlusal plane of the patient and the second coupling may be located a second distance above the occlusal place of the patient. The first distance may be greater than the second distance.

The system may also include a guard attached to the arm and shaped to displace the lips or the cheeks of the patient away from the teeth of the patient. In some embodiments the system may include a first maxillary device extending from a buccal surface of the maxilla appliance and having a first engagement surface and a second mandibular device extending from a buccal surface of the mandibular appliance and having an engagement surface. In some embodiments, the engagement of the first engagement surface with the second engagement surface advances the maxilla of the patient in an anterior direction. The maxilla appliance may also be a transpalatal appliance and include a transpalatal extension that extends between the tooth receiving cavities of a left side of the maxilla appliance and the tooth receiving cavities of a right side of the maxilla appliance.

In some embodiments, the tooth receiving cavities of the maxilla appliance are shaped to reposition at least one tooth of the maxillary arch and the tooth receiving cavities of the mandibular appliance are shaped to reposition at least one tooth of the mandibular arch. The class III corrective appliance may be shaped to releasable couple to the mandibular appliance.

In some embodiments, the system includes a first class III appliance coupling at an external surface of the mandibular appliance and a second class III appliance coupling at a tooth facing surface of the class III appliance. The first class III appliance coupling and the second class III appliance coupling may be shaped to match each other and releasably couple the mandibular appliance to the class III appliance.

A system for correcting class III malocclusions of a patient is also disclosed. The system may include a maxillary appliance having tooth receiving cavities shaped to receive and reposition the teeth of the maxilla and a first coupling for receiving an elastic and a class III corrective appliance having tooth receiving cavities shaped to receive teeth of the mandible and a second coupling shaped to receive the elastic.

In some embodiments the system may include an arm extending from the class III corrective appliance to a position above the occlusal surface of the class III corrective appliance, the second coupling located at a terminal end of the arm. The arm may extend from a buccal surface of class III corrective appliance at the location of the central incisor. In some embodiments, the first coupling is located a first distance above the occlusal plane of the patient and the second coupling is located a second distance above the occlusal place of the patient, the first distance being equal to the second distance. In some embodiments, the first coupling may be located a first distance above the occlusal plane of the patient and the second coupling may be located a second distance above the occlusal place of the patient, the first distance being greater than the second distance. Also, the tooth receiving cavities of the maxilla appliance may be shaped to reposition at least one tooth of the maxillary arch and the tooth receiving cavities of the class III corrective appliance may be shaped to reposition at least one tooth of the mandibular arch.

The system may also include a guard attached to the arm and shaped to displace the lips or the cheeks of the patient away from the teeth of the patient. The system may also include a first maxillary device extending from a buccal surface of the maxilla appliance and having a first surface and a second maxillary device extending from a buccal surface of the class III corrective appliance and having an engagement surface, wherein the engagement of the first engagement surface with the second engagement surface advances the maxilla of the patient in an anterior direction.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 6a depicts an appliance system for correcting malocclusions of a patient installed on a patient, in accordance with one or more embodiments herein;

FIG. 6b depicts the mandibular or lower appliance of the appliance system of FIG. 6a, in accordance with one or more embodiments herein;

FIG. 6c depicts the class III correction appliance of FIG. 6a, in accordance with one or more embodiments herein;

DETAILED DESCRIPTION

Figure 1A:
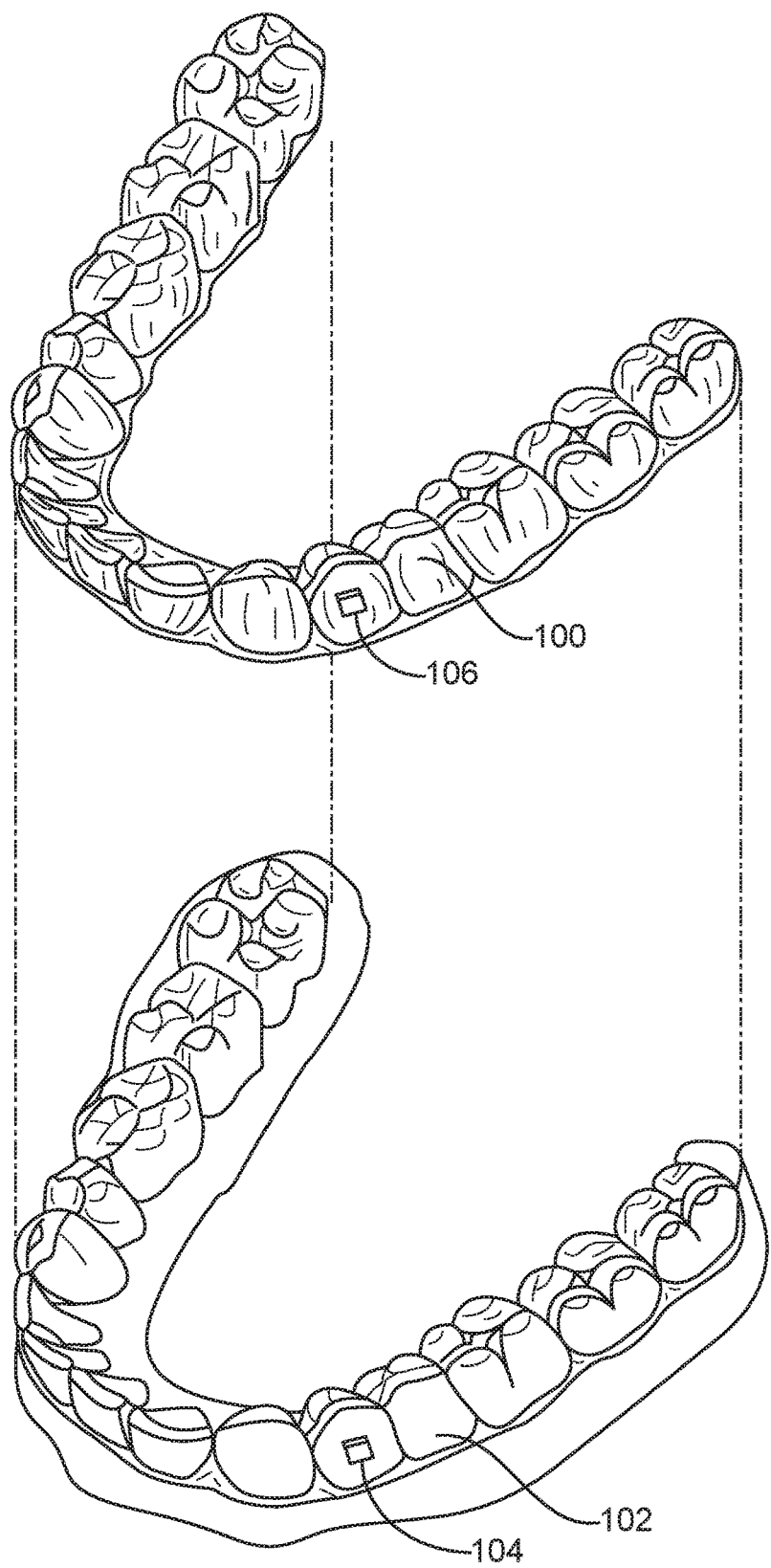
FIG. 1A illustrates a tooth repositioning appliance, in accordance with one or more embodiments herein.

A better understanding of the features and advantages of the present disclosure will be obtained by reference to the following detailed description that sets forth illustrative embodiments, in which the principles of embodiments of the present disclosure are utilized, and the accompanying drawings.

Although the detailed description contains many specifics, these should not be construed as limiting the scope of the disclosure but merely as illustrating different examples and aspects of the present disclosure. It should be appreciated that the scope of the disclosure includes other embodiments not discussed in detail above. Various other modifications, changes and variations which will be apparent to those skilled in the art may be made in the arrangement, operation and details of the methods, systems, and apparatus of the present disclosure provided herein without departing from the spirit and scope of the invention as described herein.

As used herein the terms "dental appliance," "orthodontic appliance," and "tooth receiving appliance" are treated synonymously.

As used herein the term "and/or" is used as a functional word to indicate that two words or expressions are to be taken together or individually. For example, A and/or B encompasses A alone, B alone, and A and B together.

As used herein a "plurality of teeth" encompasses two or more teeth. In some embodiments, one or more posterior teeth comprises one or more of a molar, a premolar or a canine, and one or more anterior teeth comprising one or more of a central incisor, a lateral incisor, a cuspid, a first bicuspid or a second bicuspid.

The embodiments disclosed herein are well suited for moving one or more teeth of the first group of one or more teeth or moving one or more of the second group of one or more teeth, and combinations thereof.

The embodiments disclosed herein are well suited for combination with one or more known commercially available tooth moving components such as attachments and polymeric shell appliances. In some embodiments, the appliance and one or more attachments are configured to move one or more teeth along a tooth movement vector comprising six degrees of freedom, in which three degrees of freedom are rotational and three degrees of freedom are translation.

The present disclosure provides orthodontic appliances and related systems, methods, and devices. Repositioning of teeth may be accomplished with the use of a series of removable elastic positioning appliances such as the Invisalign® system available from Align Technology, Inc., the assignee of the present disclosure. Such appliances may have a thin shell of elastic material that generally conforms to a patient's teeth but is slightly out of alignment with an initial or immediately prior tooth configuration. Placement of the appliance over the teeth applies controlled forces in specific locations to gradually move the teeth into the new configuration. Repetition of this process with successive appliances comprising new configurations eventually moves the teeth through a series of intermediate configurations or alignment patterns to a final desired configuration.

Although reference is made to an appliance comprising a polymeric shell appliance, the embodiments disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof for example. The appliance can be shaped in many ways, such as with thermoforming or direct fabrication as described herein, for example. Alternatively or in combination, the appliance can be fabricated with machining such as an appliance fabricated from a block of material with computer numeric control machining.

Turning now to the drawings, in which like numbers designate like elements in the various figures, FIG. 1A illustrates an exemplary tooth repositioning appliance or aligner 100 that can be worn by a patient in order to achieve an incremental repositioning of individual teeth 102 in the jaw. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using additive manufacturing techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some or most, and even all, of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Optionally, in cases involving more complex movements or treatment plans, it may be beneficial to utilize auxiliary components (e.g., features, accessories, structures, devices, components, and the like) in conjunction with an orthodontic appliance. Examples of such accessories include but are not limited to elastics, wires, springs, bars, arch expanders, palatal expanders, twin blocks, occlusal blocks, bite ramps, mandibular advancement splints, bite plates, pontics, hooks, brackets, headgear tubes, springs, bumper tubes, palatal bars, frameworks, pin-and-tube apparatuses, buccal shields, buccinator bows, wire shields, lingual flanges and pads, lip pads or bumpers, protrusions, divots, and the like. In some embodiments, the appliances, systems and methods described herein include improved orthodontic appliances with integrally formed features that are shaped to couple to such auxiliary components, or that replace such auxiliary components.

Figure 1B:
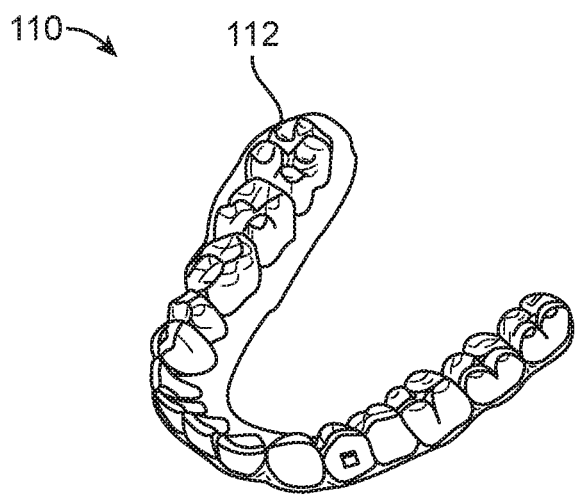
FIG. 1B illustrates a tooth repositioning system, in accordance with one or more embodiments herein.
Figure 1B:
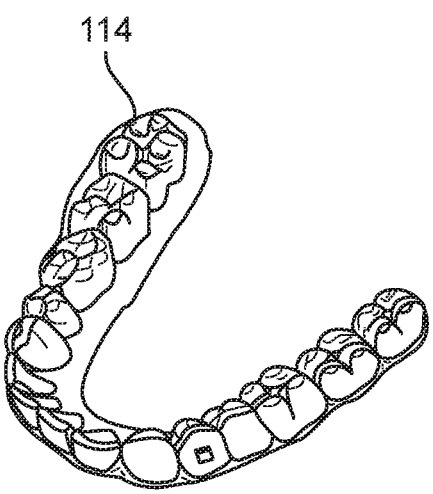
Figure 1B:
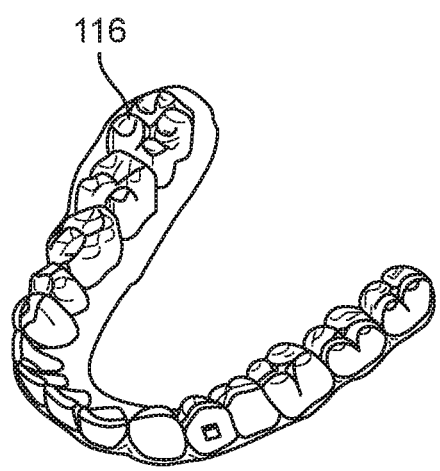

FIG. 1B illustrates a tooth repositioning system 110 including a plurality of appliances 112, 114, 116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement towards a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, remodeling or reformation of the jaw, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 1C:
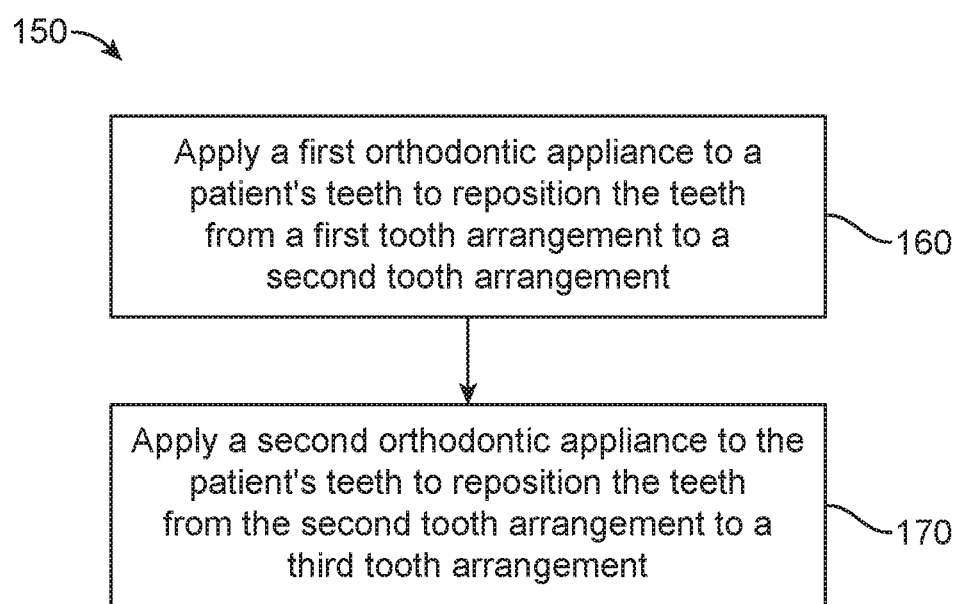
FIG. 1C illustrates a method of orthodontic treatment using a plurality of appliances, in accordance with one or more embodiments herein.

FIG. 1C illustrates a method 150 of orthodontic treatment using a plurality of appliances, in accordance with embodiments. The method 150 can be practiced using any of the appliances or appliance sets described herein. In step 160, a first orthodontic appliance is applied to a patient's teeth in order to reposition the teeth from a first tooth arrangement to a second tooth arrangement. In step 170, a second orthodontic appliance is applied to the patient's teeth in order to reposition the teeth from the second tooth arrangement to a third tooth arrangement. The method 150 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The various embodiments of the orthodontic appliances presented herein can be fabricated in a wide variety of ways. In some embodiments, the orthodontic appliances herein (or portions thereof) can be produced using direct fabrication, such as additive manufacturing techniques (also referred to herein as "3D printing) or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances herein can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances herein can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances herein. In some embodiments, material jetting involves jetting or extruding one or more materials onto a build surface in order to form successive layers of the object geometry.

In some embodiments, the direct fabrication methods provided herein build up the object geometry in a layer-by-layer fashion, with successive layers being formed in discrete build steps. Alternatively or in combination, direct fabrication methods that allow for continuous build-up of an object's geometry can be used, referred to herein as "continuous direct fabrication." Various types of continuous direct fabrication methods can be used. As an example, in some embodiments, the appliances herein are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: polymer matrix reinforced with ceramic or metallic polymers, a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step using the same fabrication machine and method. For instance, a multi-tip extrusion apparatus can be used to selectively dispense multiple types of materials (e.g., resins, liquids, solids, or combinations thereof) from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed. The relative arrangement of the first and second portions can be varied as desired, e.g., the first portion can be partially or wholly encapsulated by the second portion of the object. The sequential manufacturing steps can be performed using the same fabrication machine or different fabrication machines, and can be performed using the same fabrication method or different fabrication methods. For example, a sequential multi-manufacturing procedure can involve forming a first portion of the object using stereolithography and a second portion of the object using fused deposition modeling.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 µm, or within a range from about 5 µm to about 50 µm, or within a range from about 20 µm to about 50 µm.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every $n^{th}$ build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

Although various embodiments herein are described with respect to direct fabrication techniques, it shall be appreciated that other techniques can also be used, such as indirect fabrication techniques. In some embodiments, the appliances herein (or portions thereof) can be produced using indirect fabrication techniques, such as by thermoforming over a positive or negative mold. Indirect fabrication of an orthodontic appliance can involve one or more of the following steps: producing a positive or negative mold of the patient's dentition in a target arrangement (e.g., by additive manufacturing, milling, etc.), thermoforming one or more sheets of material over the mold in order to generate an appliance shell, forming one or more structures in the shell (e.g., by cutting, etching, etc.), and/or coupling one or more components to the shell (e.g., by extrusion, additive manufacturing, spraying, thermoforming, adhesives, bonding, fasteners, etc.). Optionally, one or more auxiliary appliance components as described herein (e.g., elastics, wires, springs, bars, arch expanders, palatal expanders, twin blocks, occlusal blocks, bite ramps, mandibular advancement splints, bite plates, pontics, hooks, brackets, headgear tubes, bumper tubes, palatal bars, frameworks, pin-and-tube apparatuses, buccal shields, buccinator bows, wire shields, lingual flanges and pads, lip pads or bumpers, protrusions, divots, etc.) are formed separately from and coupled to the appliance shell (e.g., via adhesives, bonding, fasteners, mounting features, etc.) after the shell has been fabricated.

In some embodiments, the orthodontic appliances herein can be fabricated using a combination of direct and indirect fabrication techniques, such that different portions of an appliance can be fabricated using different fabrication techniques and assembled in order to form the final appliance. For example, an appliance shell can be formed by indirect fabrication (e.g., thermoforming), and one or more structures or components as described herein (e.g., auxiliary components, power arms, etc.) can be added to the shell by direct fabrication (e.g., printing onto the shell).

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled additive manufacturing such as 3D printing, etc.). The computer-based methods presented herein can improve the accuracy, flexibility, and convenience of appliance fabrication.

In some embodiments, computer-based 3-dimensional planning/design tools, such as Treat™ software from Align Technology, Inc., may be used to design and fabricate the orthodontic appliances described herein.

Figure 2:
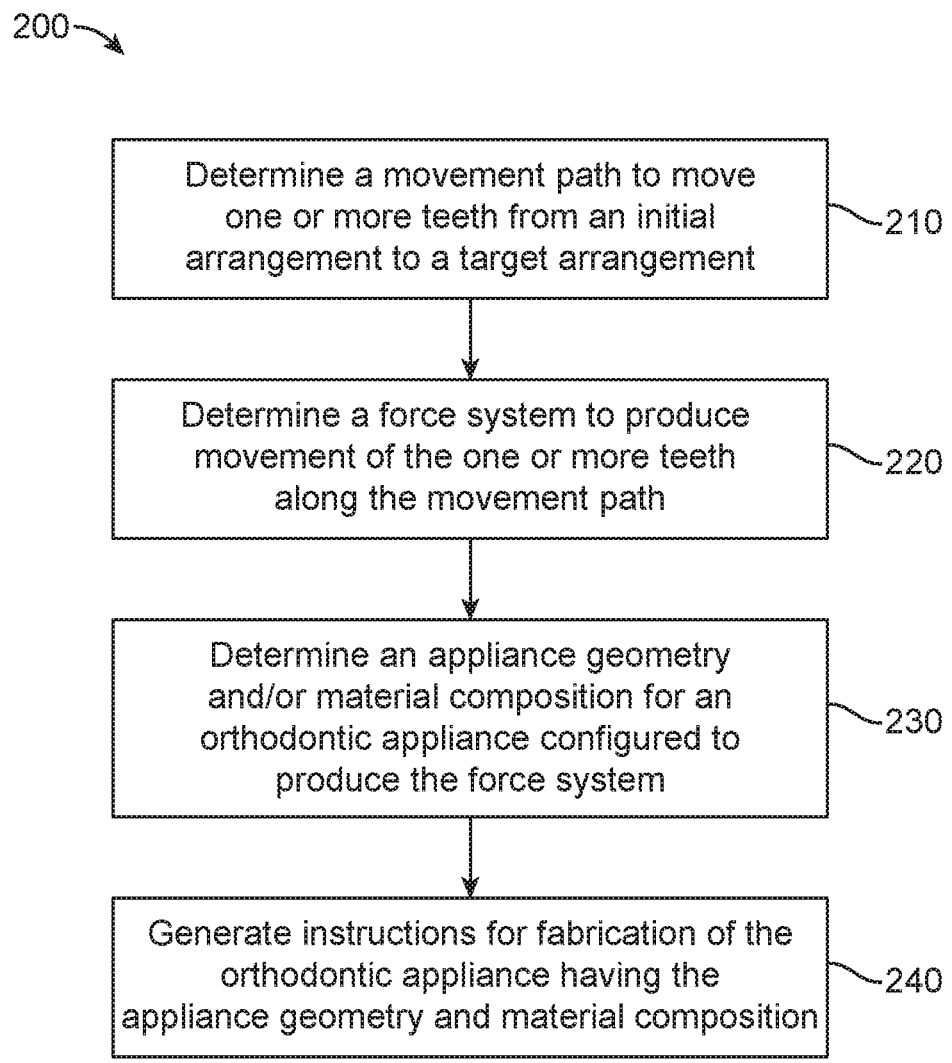
FIG. 2 illustrates a method for designing an orthodontic appliance, in accordance with one or more embodiments herein.

FIG. 2 illustrates a method 200 for designing an orthodontic appliance to be fabricated, in accordance with embodiments. The method 200 can be applied to any embodiment of the orthodontic appliances described herein. Some or all of the steps of the method 200 can be performed by any suitable data processing system or device, e.g., one or more processors configured with suitable instructions.

In step 210, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping or the most optimal fashion to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step 220, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

Determination of the force system can be performed in a variety of ways. For example, in some embodiments, the force system is determined on a patient-by-patient basis, e.g., using patient-specific data. Alternatively or in combination, the force system can be determined based on a generalized model of tooth movement (e.g., based on experimentation, modeling, clinical data, etc.), such that patient-specific data is not necessarily used. In some embodiments, determination of a force system involves calculating specific force values to be applied to one or more teeth to produce a particular movement. Alternatively, determination of a force system can be performed at a high level without calculating specific force values for the teeth. For instance, step 220 can involve determining a particular type of force to be applied (e.g., extrusive force, intrusive force, translational force, rotational force, tipping force, torqueing force, etc.) without calculating the specific magnitude and/or direction of the force.

In step 230, an appliance geometry and/or material composition for an orthodontic appliance configured to produce the force system is determined. The appliance can be any embodiment of the appliances discussed herein, such as an appliance having variable localized properties, integrally formed components, and/or power arms.

For example, in some embodiments, the appliance comprises a heterogeneous thickness, a heterogeneous stiffness, or a heterogeneous material composition. In some embodiments, the appliance comprises two or more of a heterogeneous thickness, a heterogeneous stiffness, or a heterogeneous material composition. In some embodiments, the appliance comprises a heterogeneous thickness, a heterogeneous stiffness, and a heterogeneous material composition. The heterogeneous thickness, stiffness, and/or material composition can be configured to produce the force system for moving the teeth, e.g., by preferentially applying forces at certain locations on the teeth. For example, an appliance with heterogeneous thickness can include thicker portions that apply more force on the teeth than thinner portions. As another example, an appliance with heterogeneous stiffness can include stiffer portions that apply more force on the teeth than more elastic portions. Variations in stiffness can be achieved by varying the appliance thickness, material composition, and/or degree of photopolymerization, as described herein.

In some embodiments, determining the appliance geometry and/or material composition comprises determining the geometry and/or material composition of one or more integrally formed components to be directly fabricated with an appliance shell. The integrally formed component can be any of the embodiments described herein. The geometry and/or material composition of the integrally formed component(s) can be selected to facilitate application of the force system onto the patient's teeth. The material composition of the integrally formed component can be the same as or different from the material composition of the shell.

In some embodiments, determining the appliance geometry also comprises determining the shape and position of class III correction structures and features of a class III corrective appliance, such as, for example, elastic coupling locations.

The step 230 can involve analyzing the desired force system in order to determine an appliance geometry and material composition that would produce the force system. In some embodiments, the analysis involves determining appliance properties (e.g., stiffness) at one or more locations that would produce a desired force at the one or more locations. The analysis can then involve determining an appliance geometry and material composition at the one or more locations to achieve the specified properties. Determination of the appliance geometry and material composition can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, Calif.. For creating finite element models and analyzing them, program products from a number of vendors can be used, including finite element analysis packages from ANSYS, Inc., of Canonsburg, Pa., and SIMULIA (Abaqus) software products from Dassault Systemes of Waltham, Mass.

Optionally, one or more appliance geometries and material compositions can be selected for testing or force modeling. As noted above, a desired tooth movement, as well as a force system required or desired for eliciting the desired tooth movement, can be identified. Using the simulation environment, a candidate appliance geometry and composition can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

Optionally, step 230 can further involve determining the geometry of one or more auxiliary components to be used in combination with the orthodontic appliance in order to exert the force system on the one or more teeth. Such auxiliaries can include one or more of tooth-mounted attachments, elastics, wires, springs, bite blocks, arch expanders, wire-and-bracket appliances, shell appliances, headgear, or any other orthodontic device or system that can be used in conjunction with the orthodontic appliances herein. The use of such auxiliary components may be advantageous in situations where it is difficult for the appliance alone to produce the force system. Additionally, auxiliary components can be added to the orthodontic appliance in order to provide other desired functionalities besides producing the force system, such as mandibular advancement splints to treat sleep apnea, pontics to improve aesthetic appearance, and so on. In some embodiments, the auxiliary components are fabricated and provided separately from the orthodontic appliance. Alternatively, the geometry of the orthodontic appliance can be modified to include one or more auxiliary components as integrally formed components.

Optionally, step 230 can further involve determining the geometry of one or more auxiliary components or appliances to be used in combination with the orthodontic appliance in order to exert the force system on a patient's maxilla. Such components or appliances can include one or more of class III correction appliances and features, such as described herein with respect to FIGS. 6-9, as well as features described above, such as tooth-mounted attachments, elastics, wires, springs, bite blocks, arch expanders, wire-and-bracket appliances, shell appliances, headgear, or any other orthodontic device or system that can be used in conjunction with the orthodontic appliances herein. The use of such auxiliary components or appliances may be advantageous in situations where it is difficult for the appliance alone to produce the force system. Additionally, auxiliary components can be added to the orthodontic appliance in order to provide other desired functionalities besides producing the force system. In some embodiments, the auxiliary components are fabricated and provided separately from the orthodontic appliance. Alternatively, the geometry of the orthodontic appliance can be modified to include one or more auxiliary components or appliances as integrally formed components.

In step 240, instructions for fabrication of the orthodontic appliance having the appliance geometry and material composition are generated. The instructions can be configured to control a fabrication system or device in order to produce the orthodontic appliance with the specified appliance geometry and material composition. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.). Optionally, the instructions can be configured to cause a fabrication machine to directly fabricate the orthodontic appliance with teeth receiving cavities having variable gable bends, as discussed above and herein. In alternative embodiments, the instructions can be configured for indirect fabrication of the appliance, e.g., by thermoforming.

Although the above steps show a method 200 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 200 may be performed with any suitable fabrication system or device, such as the embodiments described herein. Some of the steps may be optional, and the order of the steps can be varied as desired. For instance, in some embodiments, step 220 is optional, such that step 230 involves determining the appliance geometry and/or material composition based directly on the tooth movement path rather than based on the force system.

Figure 3:
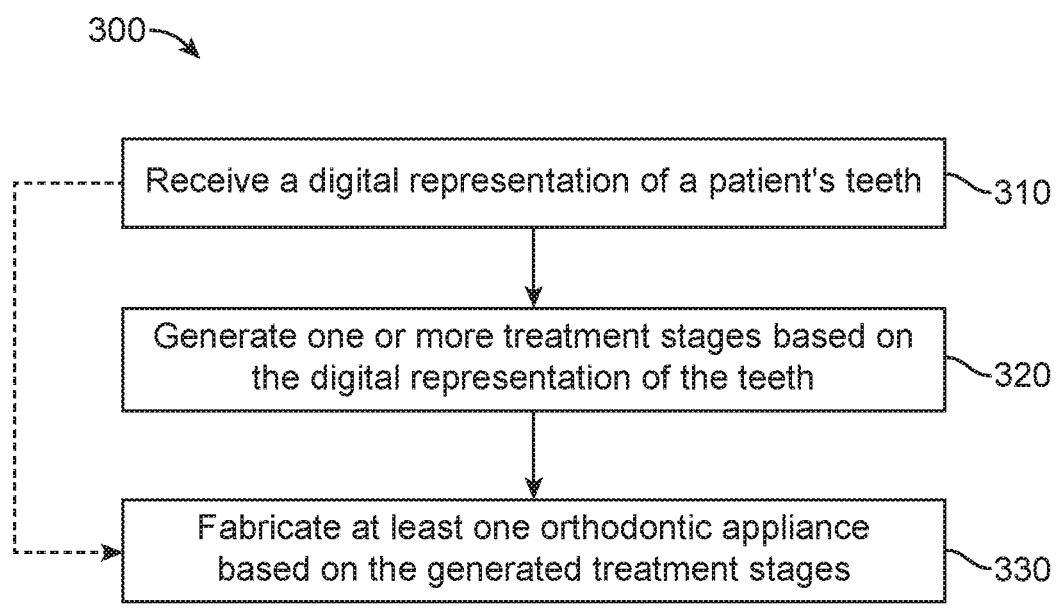
FIG. 3 illustrates a method for digitally planning an orthodontic treatment, in accordance with one or more embodiments herein.

FIG. 3 illustrates a method 300 for digitally planning an orthodontic treatment and/or design or fabrication of an appliance, in accordance with embodiments. The method 300 can be applied to any of the treatment procedures described herein and can be performed by any suitable data processing system.

In step 310, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 320, one or more treatment stages are generated based on the digital representation of the teeth. The treatment stages can be incremental repositioning stages of an orthodontic treatment procedure designed to move one or more of the patient's teeth or arch, such as the maxilla, from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 330, at least one orthodontic appliance is fabricated based on the generated treatment stages. For example, a set of appliances can be fabricated, each shaped according to a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 3, design and/or fabrication of an orthodontic appliance, and perhaps a particular orthodontic treatment, may include use of a representation of the patient's teeth (e.g., receive a digital representation of the patient's teeth 310), followed by design and/or fabrication of an orthodontic appliance based on a representation of the patient's teeth in the arrangement represented by the received representation.

Optionally, some or all of the steps of the method 300 are performed locally at the site where the patient is being treated and during a single patient visit, referred to herein as "chair side manufacturing." Chair side manufacturing can involve, for example, scanning the patient's teeth, automatically generating a treatment plan with treatment stages, and immediately fabricating one or more orthodontic appliance(s) to treat the patient using a chair side direct fabrication machine, all at the treating professional's office during a single appointment. In embodiments where a series of appliances are used to treat the patient, the first appliance may be produced chair side for immediate delivery to the patient, with the remaining appliances produced separately (e.g., off site at a lab or central manufacturing facility) and delivered at a later time (e.g., at a follow up appointment, mailed to the patient). Alternatively, the methods herein can accommodate production and immediate delivery of the entire series of appliances on site during a single visit. Chair side manufacturing can thus improve the convenience and speed of the treatment procedure by allowing the patient to immediately begin treatment at the practitioner's office, rather than having to wait for fabrication and delivery of the appliances at a later date. Additionally, chair side manufacturing can provide improved flexibility and efficiency of orthodontic treatment. For instance, in some embodiments, the patient is re-scanned at each appointment to determine the actual positions of the teeth, and the treatment plan is updated accordingly. Subsequently, new appliances can be immediately produced and delivered chair side to accommodate any changes to or deviations from the treatment plan.

Figure 4:
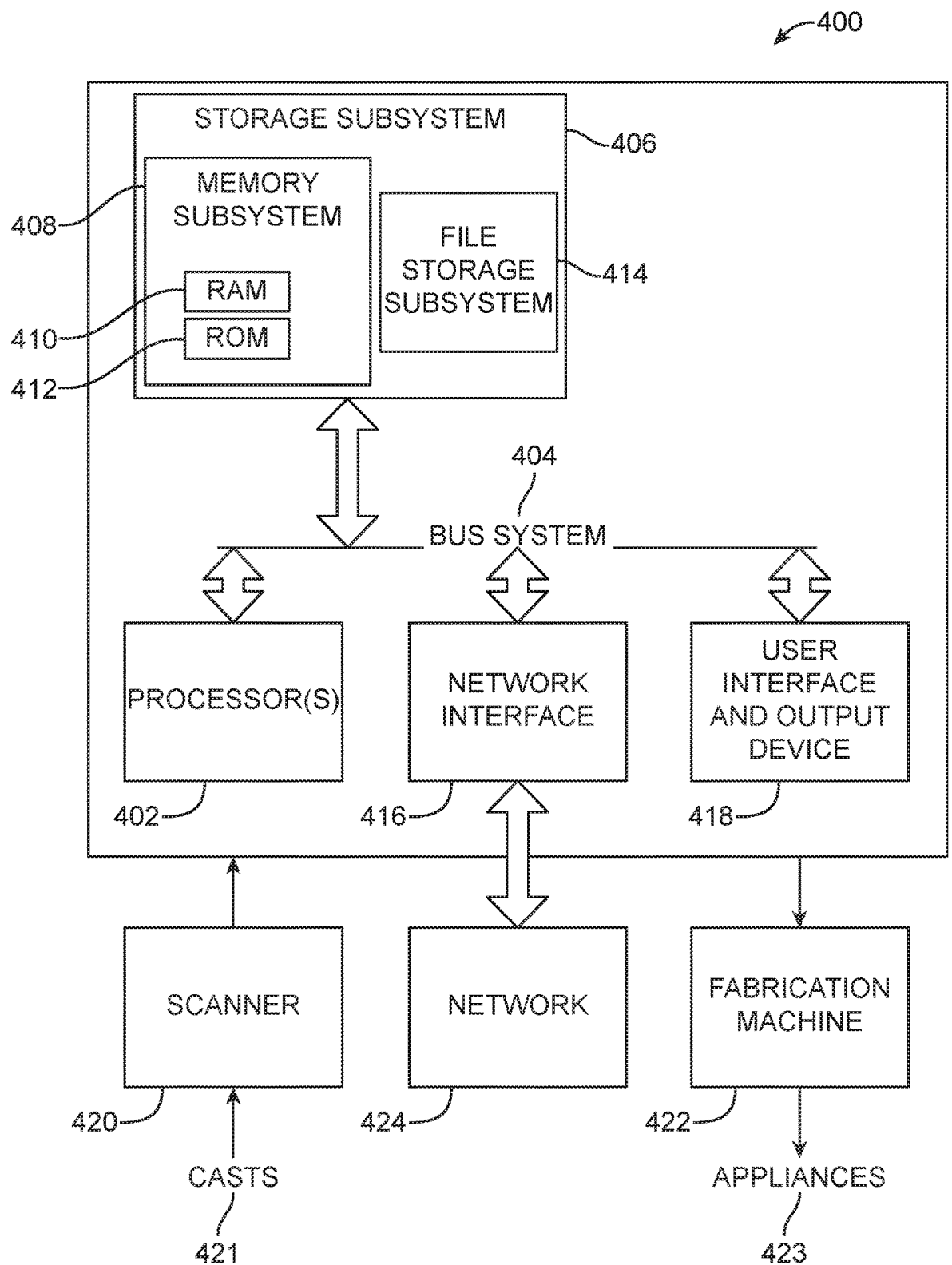
FIG. 4 is a simplified block diagram of a data processing system, in accordance with one or more embodiments herein.

FIG. 4 is a simplified block diagram of a data processing system 400 that may be used in executing methods and processes described herein. The data processing system 400 typically includes at least one processor 402 that communicates with one or more peripheral devices via bus subsystem 404. These peripheral devices typically include a storage subsystem 406 (memory subsystem 408 and file storage subsystem 414), a set of user interface input and output devices 418, and an interface to outside networks 416. This interface is shown schematically as "Network Interface" block 416, and is coupled to corresponding interface devices in other data processing systems via communication network interface 424. Data processing system 400 can include, for example, one or more computers, such as a personal computer, workstation, mainframe, laptop, and the like.

The user interface input devices 418 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 406 maintains the basic required programming, including computer readable media having instructions (e.g., operating instructions, etc.), and data constructs. The program modules discussed herein are typically stored in storage subsystem 406. Storage subsystem 406 typically includes memory subsystem 408 and file storage subsystem 414. Memory subsystem 408 typically includes a number of memories (e.g., RAM 410, ROM 412, etc.) including computer readable memory for storage of fixed instructions, instructions and data during program execution, basic input/output system, etc. File storage subsystem 414 provides persistent (non-volatile) storage for program and data files, and can include one or more removable or fixed drives or media, hard disk, floppy disk, CD-ROM, DVD, optical drives, and the like. One or more of the storage systems, drives, etc., may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

Scanner 420 includes any means for obtaining a digital representation (e.g., images, surface topography data, etc.) of a patient's teeth (e.g., by scanning physical models of the teeth such as casts 421, by scanning impressions taken of the teeth, or by directly scanning the intraoral cavity), which can be obtained either from the patient or from treating professional, such as an orthodontist, and includes means of providing the digital representation to data processing system 400 for further processing. Scanner 420 may be located at a location remote with respect to other components of the system and can communicate image data and/or information to data processing system 400, for example, via a network interface 424. Fabrication system 422 fabricates appliances 423 based on a treatment plan, including data set information received from data processing system 400. Fabrication machine 422 can, for example, be located at a remote location and receive data set information from data processing system 400 via network interface 424.

The data processing aspects of the methods described herein can be implemented in digital electronic circuitry, or in computer hardware, firmware, software, or suitable combinations thereof. Data processing apparatus can be implemented in a computer program product tangibly embodied in a machine-readable storage device for execution by a programmable processor. Data processing steps can be performed by a programmable processor executing program instructions to perform functions by operating on input data and generating output. The data processing aspects can be implemented in one or more computer programs that are executable on a programmable system, the system including one or more programmable processors operably coupled to a data storage system. Generally, a processor will receive instructions and data from a read-only memory and/or a random access memory. Storage devices suitable for tangibly embodying computer program instructions and data include all forms of nonvolatile memory, such as: semiconductor memory devices, such as EPROM, EEPROM, and flash memory devices; magnetic disks such as internal hard disks and removable disks; magneto-optical disks; and CD-ROM disks.

Figure 5:
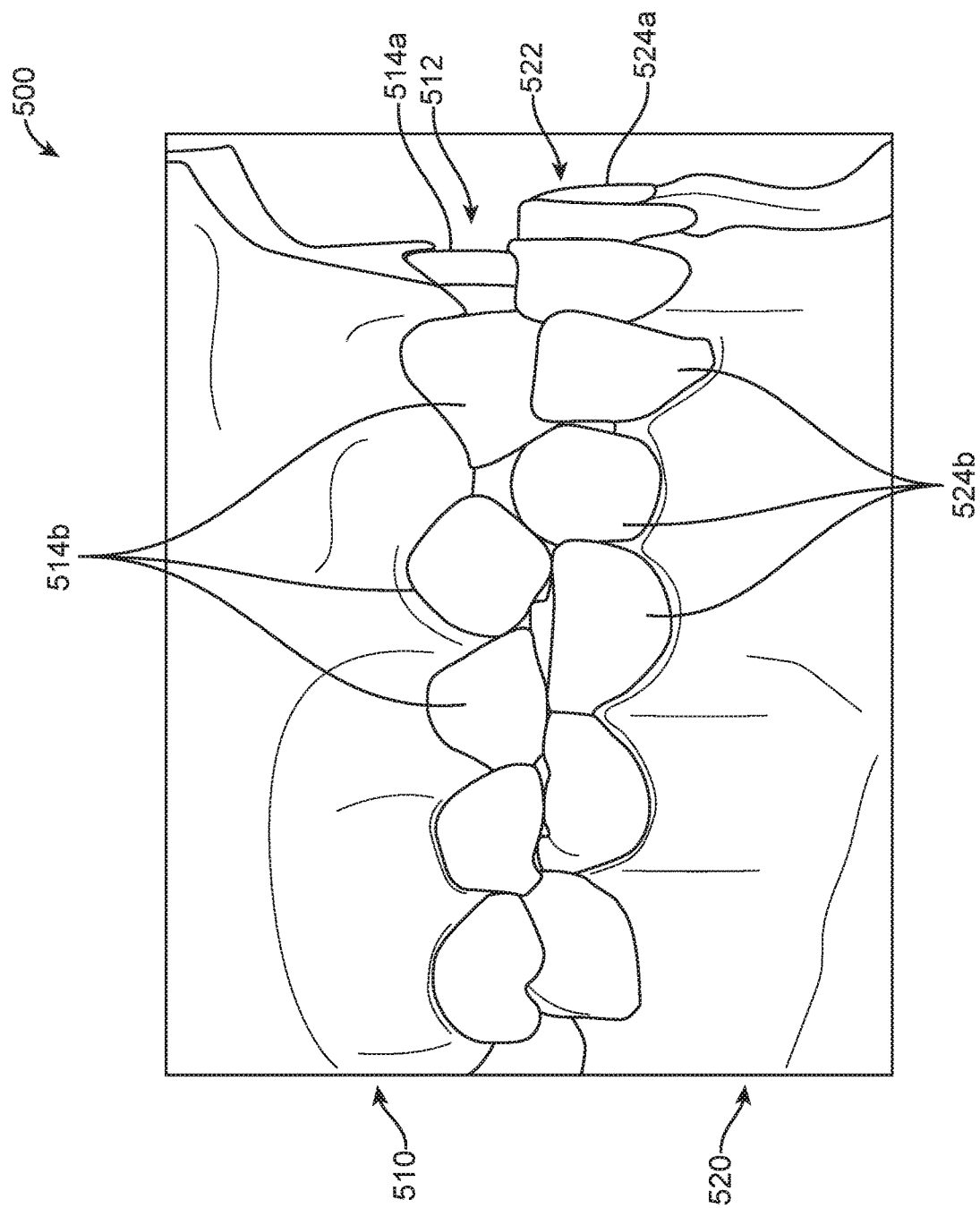
FIG. 5 depicts an embodiment of a class III malocclusion of a patient's teeth.

FIG. 5 depicts class III malocclusion of a patient. The jaw 500 of a patient includes an upper jaw 510, sometimes called the maxillary jaw, which includes the upper or maxillary arch 512 of upper teeth 514. The jaw 500 also includes the lower jaw 520, sometimes called the mandibular jaw, which includes the lower or mandibular arch 522 of lower teeth 524.

In a class III malocclusion, the maxillary anterior teeth 514a of the maxillary arch 512 rests posterior to the mandibular anterior teeth 524a of the mandibular arch 522. Class II malocclusions may also cause posterior teeth 514b, 524b of the respective arches 512, 514 to have in a cross bite malocclusion, such that the buccal cusp tips of posterior teeth of the upper arch 512 rest inside the fossae of the lower teeth of the lower arch 522, instead of the cusp tips of the lower arch teeth resting inside the fossae of the teeth of the upper arch. Class III malocclusion causes an improper bite relationship between the teeth of the upper arch and the teeth of the lower arch. Class III and cross bite malocclusions may result in difficulty chewing and facial aesthetics that some people find undesirable. The systems described herein correct these and other malocclusions.

Referring now to FIGS. 6a, 6b, and 6c an appliance system 600 for correcting malocclusions of a patient is shown as installed on a patient. The appliance system 600 may include multiple individual appliances. For example, as shown in FIGS. 6a, 6b, and 6c, the appliance system 600 includes three appliances. In particular, the system 600 includes an upper tooth repositioning appliance 610, a lower tooth repositioning appliance 630, and a class III corrective appliance 650. This combination of appliances allows for the repositioning of teeth in both the upper and lower arches using the repositioning appliance 610, 630 during the same stage or stages of treatment as the correction of the class III malocclusion occurs with the class III corrective appliance 650.

The upper appliance 610 and lower appliance 630 may be similar to the appliance 100 and appliances 112, 114, 116 described above with respect to FIGS. 1A and 1B. The upper and lower appliances 610, 630 may be tooth repositioning appliances that can be worn by a patient in order to achieve an incremental repositioning of individual teeth in the jaw. The appliance can include a shell having teeth-receiving cavities 614, 632 that receive and resiliently reposition the teeth. An appliance or portion(s) thereof may be indirectly fabricated using a physical model of teeth. For example, an appliance can be formed using a physical model of teeth and a sheet of suitable layers of polymeric material. In some embodiments, a physical appliance is directly fabricated, e.g., using additive manufacturing techniques, from a digital model of an appliance. An appliance can fit over all teeth present in an upper or lower jaw, or less than all of the teeth. The appliance can be designed specifically to accommodate the teeth of the patient, and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some or most, and even all, of the teeth will be repositioned at some point during treatment. Teeth that are moved can also serve as a base or anchor for holding the appliance as it is worn by the patient.

The appliance system 600 also includes a class III appliance 650 that aids in correcting class III malocclusions in patients. The appliance 650 includes two mounts 652, 654 connected to each other by a bridge 660 that extends between and separates the mounts 652, 654. The structure and features of the mounts 652, 654 are described herein with reference to the right mount 652, however the structure and features of the right mount 652 also apply to the left mount 654 and also to single mount systems, as described herein.

The class III appliance 650 may be a directly fabricated appliance which may be fabricated as discussed above.

Figure 7A:
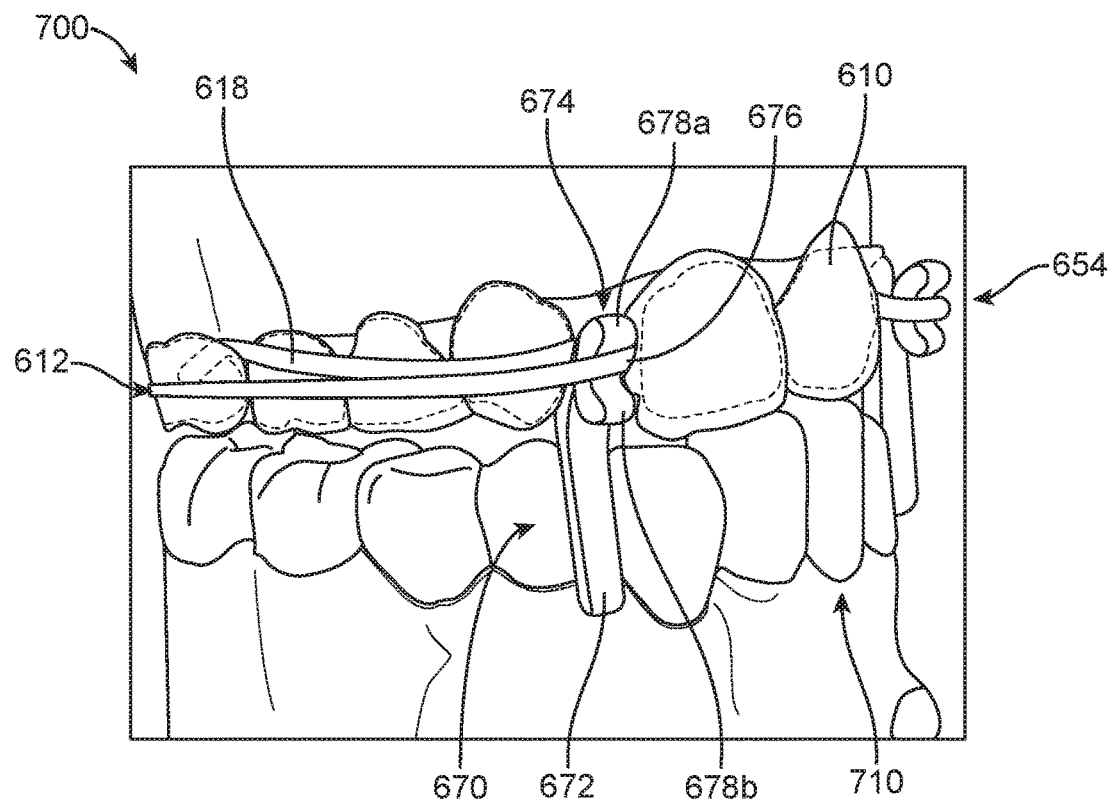
FIG. 7a depicts an appliance system for correcting class III malocclusions of a patient installed on a patient, in accordance with one or more embodiments herein.
Figure 7B:
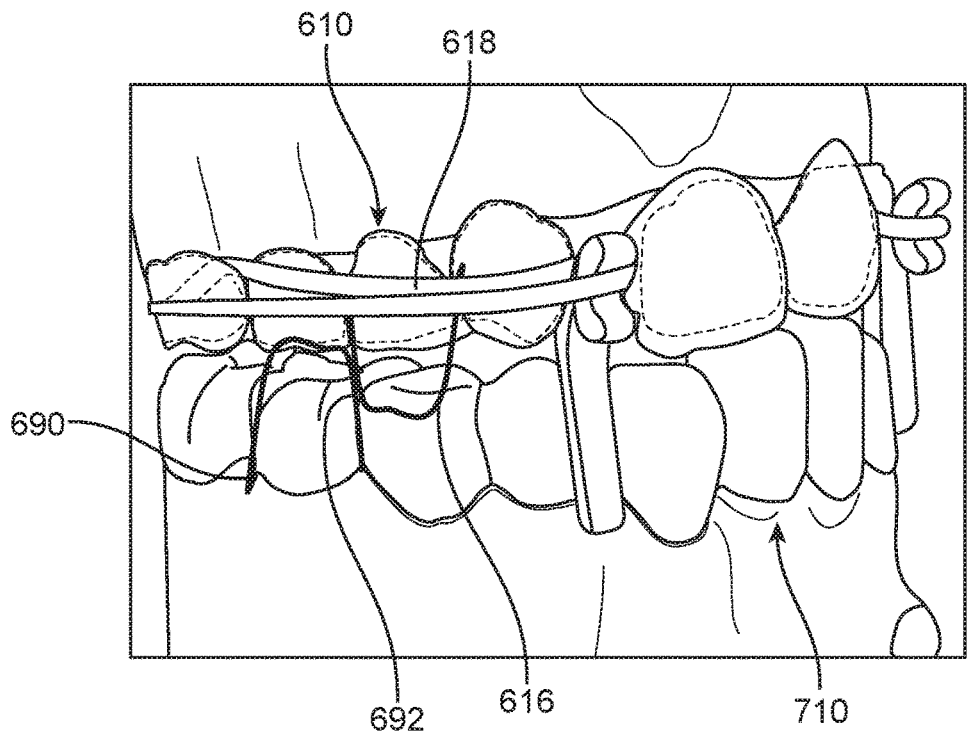
FIG. 7b depicts the appliance system of FIG. 7a with maxillary devices, in accordance with one or more embodiments herein.

The mount 652 includes a cavity 656 that couples the mount 652 to the appliance 650. In some embodiments, the cavity 656 may be a tooth receiving cavity that couples directly to the one or more teeth of the patient, for example, as shown in FIGS. 7a and 7b. In some embodiments, the cavity 656 receives the teeth indirectly, for example via the appliance 630. In such an embodiment, the cavity 656 may be shaped to receive and couple with the outer surface of the lower appliance 630. The cavity 656 releasably couples the class III appliance 650 to the tooth repositioning appliance 630.

Figure 6D:
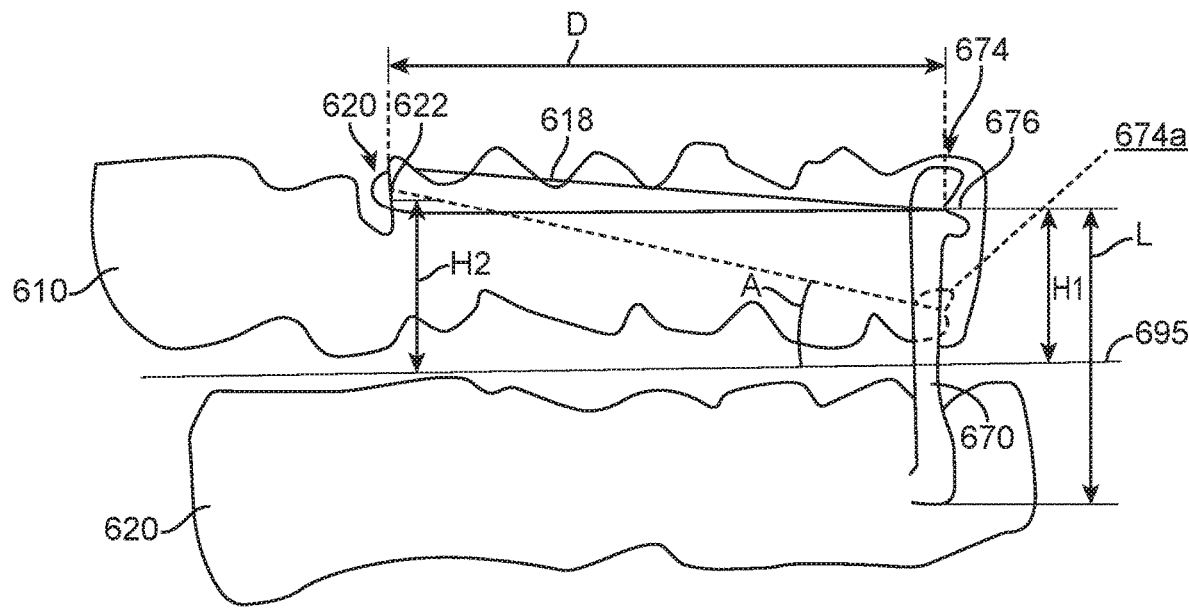
FIG. 6d depicts a side view of the appliance system of FIG. 6a, in accordance with one or more embodiments herein.
Figure 6E:
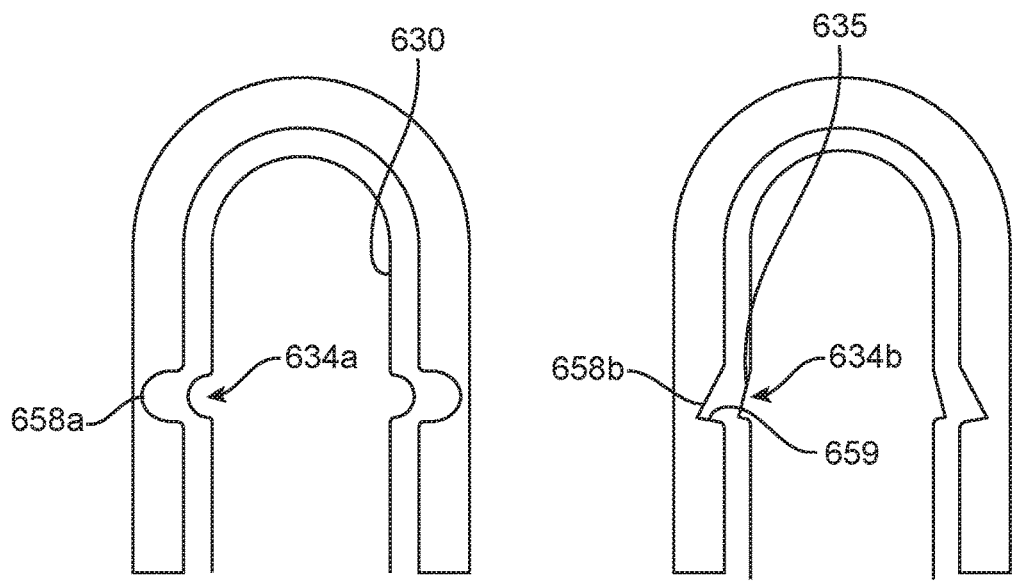
FIG. 6e depicts a cross-sectional view E-E of the appliance system of FIG. 6b, in accordance with one or more embodiments herein.

FIG. 6e shows embodiments of systems for releasably coupling the class III appliance 650 and the tooth repositioning appliance 630. The tooth repositioning appliance 630 may include one or more protrusions 634 on one or both of the outer buccal and lingual surfaces of the appliance 630. The protrusion may engage with one or more respective receptacles or cavities 658 in the inner or tooth facing surface to couple the class III appliance 650 with the tooth repositioning appliance 630.

The cavities 658 may have a shape and size that mates with the shape and size of the corresponding protrusions 634. For example, cavity 658a has a semicircular cross-sectional shape that mates with the semicircular cross-sectional shape of the protrusion 634a. As shown in the right hand side of FIG. 6e, the receptacle 658b and cavity 634b may include respective engagement surfaces 659, 635 that are shaped to resist removal of the class III appliance from the repositioning appliance 630, while permitting intentional removal of the appliance.

Each mount 652 may also include an arm or extension 670 with a coupling 674 at a terminal end thereof. The arm 670 is coupled to the mount at a buccal surface of the class III appliance 650, for example at the mount 670. In some embodiments, the arm is integral to the mount and extends upwards beyond the occlusal surfaces of the class III appliance 650 and the tooth repositioning appliance 630. In some embodiments, the arm extends beyond the occlusal plane of the patent when the appliance 650 is installed on the patient. The arm 670 may include both an anchored portion 673, that is coupled or integral to the buccal surface of the appliance 650 and a cantilevered portion 675 that extends away from the appliance 650.

The coupling 674 may be located at the terminal or distal end of the arm 670. The coupling 674 may be shaped to receive an elastic or a portion of an elastic, such as the elastic 618. The terminal end of the arm 670 may also include a button coupling, be custom shaped based on the treatment plan, may be flat or otherwise shaped to receive any other auxiliary, as determined in the treatment plan or by a doctor. The coupling 674 includes finger extension 678 on either side of a receptacle 676. The finger extensions 678 in combination with the receptacle 676 aid in positing an end of the elastic 618 at a particular location in space relative to the patient's jaw or relative to one or more of the appliances 610, 630, 650.

A second portion or end of the elastic 618 may be engaged with or otherwise coupled to the upper appliance 610 via the coupling 620. As shown in more detail in FIG. 6d, the coupling 620 may extend from a gingival surface of a buccal wall of the appliance 610 towards the occlusal surface of the appliance 610. The coupling 620 may be a slit formed by a cut in the buccal wall of the appliance 610. In some embodiments, the coupling 620 may be an orthodontic button that may be bonded directly to the tooth. In such an embodiment, the aligner may have a cut out to accommodate the button. In some embodiments, the coupling 620 may be formed via a material removal operation wherein a portion of the wall of the appliance 610 is removed. In some embodiments, the coupling 620 may include a recess 622 on an anterior edge of the coupling. The recess 622 may be located at a particular location relative to the location of the receptacle 676 of the coupling 674 in order to receive the elastic in a particular location and apply a particular force vector to the upper arch.

By adding the coupling 620 to the upper appliance, the arch repositioning force that is applied by the elastic to the upper appliance 610 may be distributed to the entire arch of teeth. This allows the teeth to move together, as a unit. The force applied to the teeth also elicits a biological response in the upper arch and maxilla, encouraging growth of the maxilla. As the repositioning force is applied to the arch, the maxilla undergoes reformation and remodeling of the arch can correct class III malocclusions, even severe class III malocclusions that cannot be treated with tooth repositioning alone, so called camouflage treatments.

In some embodiments, the maxillary arch may be moved in multiple directions. For example, the maxillary arch may be encouraged to grow in a direction parallel to the occlusal plane. In such an embodiment, the angle A, between the coupling 620 on the appliance 610 and the coupling 674 of the class III appliance 650 with respect to the occlusal plane 695 may be 0 degrees, such that the elastic is parallel or substantially parallel to the occlusal plane. In some embodiments, the maxillary arch may be encouraged to grow in an anterior direction and in an occlusal direction, towards the mandibular arch.

The length and position of the arms 674 and attached receptacle 676 and the position of the coupling 620 can be selected to elicit particular forces on the upper arch. As shown in FIG. 6d, the arm 674 may have a length L between the receptacle 676 at one end and the arm's attachment to the mount 670. The receptacle 676 may also extend a height H1 above the occlusal plane, which may be determined, at least in part by the length L of the arm. In addition, the coupling 620 may be a height H2 from the occlusal plane. The distance D is the distance between the coupling 620 on the appliance 610 of the upper arch and the coupling 674 of the appliance 650.

The relative heights H1, H2, angle A, and the distance D may be varied and controlled to elicit a particular force system on the upper arch. For example, as shown by dashed lines in FIG. 6d, the coupling 674 can be moved to a lower position 674a such that the angle A increases. The increased angle with respect to the occlusal plane causes the elastic to apply a force in a downward (towards the occlusal plane) and anterior direction. This force may cause the arch of teeth to move forward and downward. Such a forward and downward movement may reduce a class III occlusion and also reduce open bite in a patient, thereby treating two different malocclusions at the same time.

In addition, the anterior-posterior position of one or both of the coupling 620 and the coupling 674 maybe moved to increase or decrease the distance D between the coupling 620, 674. For example, while the arm 670 and associate coupling 674 are shown as being coupled at or near the canine teeth, the arm may be positioned in other locations, for example, at or near the incisors, lateral incisors, cupids, bicuspids, or molars. Similarly, the coupling 620 is shown at the second molar, however, the coupling 620 may be positioned at or near the first molar, or the bicuspids.

One advantage of the systems described herein is that the arm remains in the oral cavity and does not extend outside the cavity. This aids concealing the appliance from view during everyday use which may lead to increased use (compliance) by patients as compared to external appliances that can be seen by others.

Referring now to FIG. 7a which depicts an appliance system for correcting malocclusions of a patient installed on a patient. Similar features are given the same reference numbers as shown and discussed above with respect to FIGS. 6a-6e. As shown in FIG. 7a, the appliance system 700 may include two appliances, an upper appliance 610 made from thermoformed polymer sheet and have features substantially as described with respect to FIGS. 6a-6e, however the directly fabricated class III appliance 710 includes a plurality of teeth receiving cavities to directly receive and reposition the teeth of the patient, obviating the use of a separate thermoformed appliance to reposition the teeth of the lower arch. This combination of appliances allows for the repositioning of teeth in both the upper and lower arches during the same stage or stages of treatment as the correction of the class III malocclusion occurs.

The class III appliance 710 may include one or more arms or extension 670 having a coupling 674 at a terminal end thereof. The arm 670 extends from a buccal surface of the class III appliance 710, for example at the outward facing external surface of the canine tooth receiving cavity. The arm 670 extends upwards beyond the occlusal surfaces of the appliance 710. In some embodiments, the arm extends beyond the occlusal plane of the patent when the appliance 710 is installed on the patient. The arm 670 may include both an anchored portion 673, that is coupled or integral to the buccal surface of the appliance 650 and a cantilevered portion 675 that extends away from the appliance 650.

The coupling 674 may be located at the terminal or distal end of the arm 670. The coupling 674 may be shaped to receive an elastic or a portion of an elastic, such as the elastic 618. The coupling 674 includes finger extension 678 on either side of a receptacle 676. The finger extensions 678 in combination with the receptacle 676 aid in positing an end of the elastic 618 at a particular location in space relative to the patient's jaw or relative to one or more of the appliances 610, 710, for example, as discussed above with respect to FIG. 6d.

FIG. 7b depicts the appliance system of FIG. 7a with class III correction protrusions 690, 616 that advance the teeth of the upper arch. Such protrusions 690, 616 may be referred to as maxillary devices or maxillary growth modification devices. Maxillary devices may restrict the growth of the mandible while applying forces on the maxilla in the forward direction to help redirect its growth.

The upper appliance 610 may include the upper maxillary device 616 and the lower appliance 710 may include the lower maxillary device 690. The maxillary devices 616, 690 can be positioned in different locations about the arch. For example, the upper maxillary device 616 and the lower maxillary device 690 may be positioned near occlusal surfaces of the teeth of the patient to advance the placement of the maxilla in a forward direction such as in an anterior direction toward a patient's lips. As an example, the upper maxillary device 616 may include a first surface 618 and the lower maxillary device 690 may include a second surface 962 to interface, interact, and/or otherwise engage with the first surface 618 of the upper maxillary device 616. The forces imparted on the maxilla by the interaction of the upper maxillary device 616 with the lower maxillary device 690 may cause remolding of the upper maxilla and anterior advancement of the upper arch with respect to the lower arch.

The upper maxillary device 616 may be positioned near occlusal, buccal, or lingual sides or walls of the upper appliance 610 and the lower maxillary device 690 may be positioned near occlusal, buccal, or lingual sides or walls of the lower appliance 710. Placement of the lower maxillary device 690 on the buccal sides or walls have the additional advantage of displacing the cheeks or lips of the patient away from the class III appliance 710, thereby reducing the forces applied by the cheeks to the upper arch of the patient.

Referring now to FIGS. 8a-8d an appliance system 800 for correcting malocclusions of a patient is shown. The system includes a lower appliance 810 and an upper appliance 802. The upper and lower appliances 802, 810 have respective maxilla repositioning devices 834, 812 thereon. The respective maxilla repositioning devices 834, 812 have similar features and functions as described above with respect to the upper and lower maxillary devices 616, 690 shown and described with respect to FIG. 7b. For example, the upper maxillary device 834 can include a first surface 836 and the lower maxillary device 812 can include a second surface 819 to interface, interact, and/or otherwise engage with the first surface 836 of the upper maxillary device 834. The forces imparted on the maxilla by the interaction of the upper maxillary device 834 with the lower maxillary device 812 may cause remolding of the upper maxilla and anterior of the upper arch with respect to the lower arch.

However, the upper appliance 802 also includes transpalatal features. As shown in FIG. 8d the appliance 802 may include a transpalatal extension 844 that extends between the tooth receiving cavities 842 on the left side of the arch and the tooth receiving cavities 842 on the right side of the arch. The transpalatal extension 844 may be shaped to conform to the posterior palate and include an anterior palate extension 846 that is shaped to match the surface of the anterior palate. The transpalatal extension 844 may perform two functions. First, the anterior extension 846 transmits at least a portion of the force imparted on the upper appliance 802 by the lower maxillary device 812 to the anterior palate. These forces may cause the anterior portion of the maxilla and the anterior teeth to move in an anterior direction, thereby aiding in the treatment of class III malocclusions.

While the transpalatal extension 844 is shown in FIG. 8d as covering the palate, in some embodiments, depending on the treatment plan and the corrections prescribed, less than the entire palate may be covered or engaged by the transpalatal device. Moreover, the transpalatal device 844 may include more or less tooth receiving cavities 842 than shown in FIG. 8d, depending on the treatment plan.

Second, the transpalatal extension 844 may be shaped such that when the appliance 802 is installed on a patient's arch, the extension 844 applies an outwardly directed force to the posterior teeth to cause the posterior portion of the arch to expand and correct cross-bite malocclusions which are common in patients that have class III malocclusions.

Figure 8A:
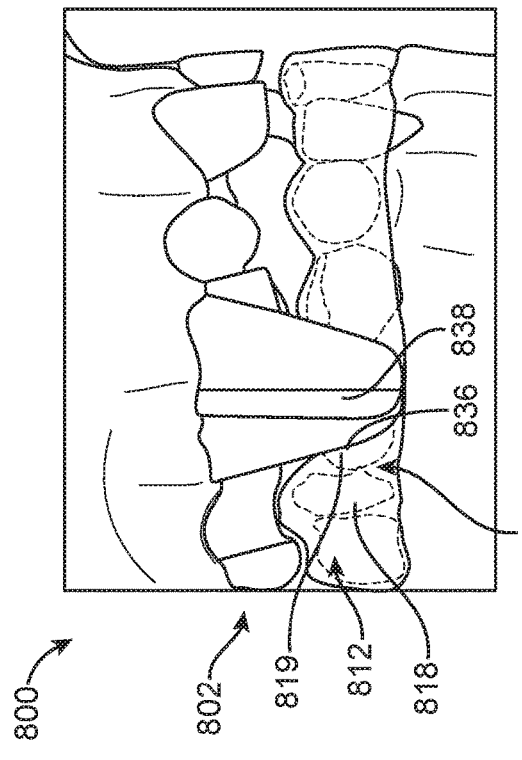
FIG. 8a depicts a side view of an appliance system for correcting malocclusions of a patient installed on a patient, in accordance with one or more embodiments herein.
Figure 8B:
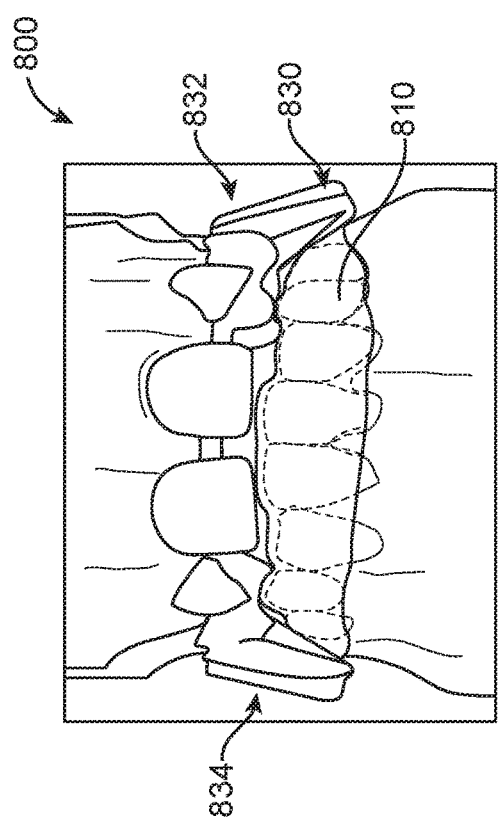
FIG. 8b depicts a front view of the appliance system of FIG. 8a, in accordance with one or more embodiments herein.
Figure 8C:
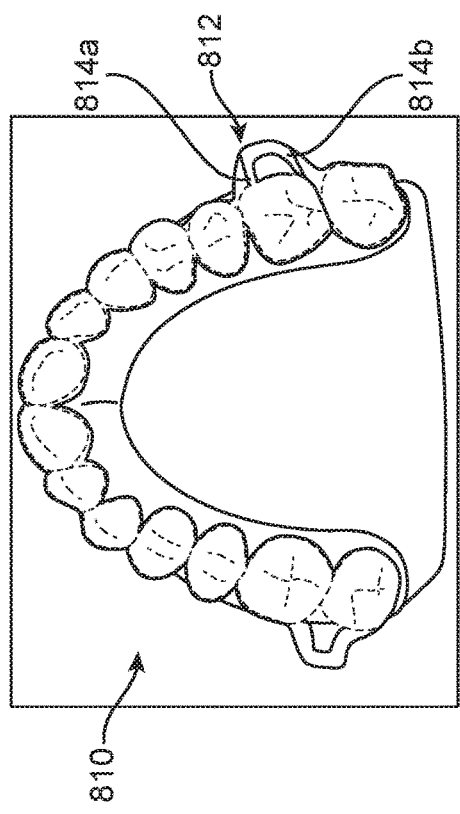
FIG. 8c depicts an occlusal view of the mandibular, or lower, appliance of FIG. 8a, in accordance with one or more embodiments herein.
Figure 8D:
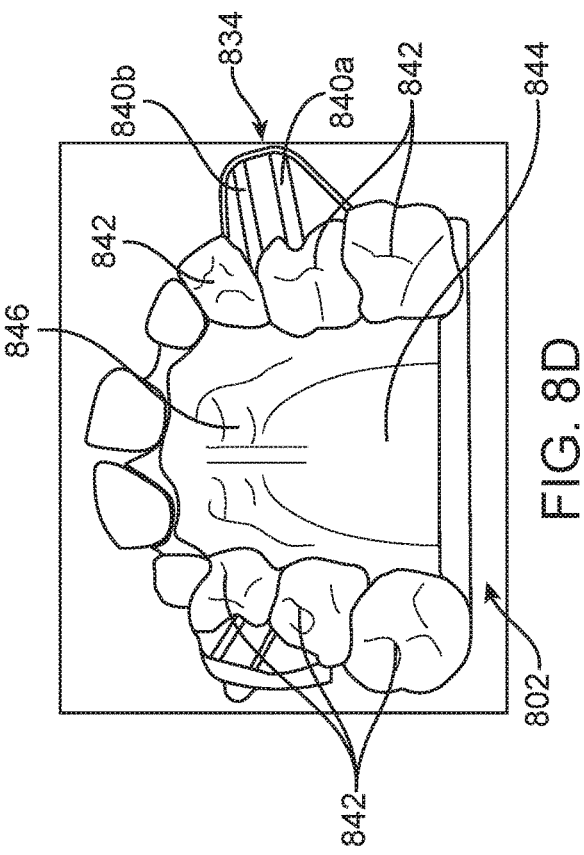
FIG. 8d depicts an occlusal view of the maxilla, or upper, appliance of FIG. 8a, in accordance with one or more embodiments herein.

As also shown in FIGS. 8a-8d, the upper maxillary device 834 and the lower maxillary device 812 may each include stiffening structures. For example, as shown in FIGS. 8a and 8d, the upper maxillary device 834 includes lingual stiffening bars 840a, 840b on the lingual side of the upper maxillary device 834 and buccal stiffening bar 838 on the buccal side of the upper maxillary device 834.

As shown in FIGS. 8a and 8c, the lower maxillary device 812 includes lingual stiffening bars 814a, 814b on the lingual side of the upper maxillary device 834 and buccal stiffening bar 818 on the buccal side of the lower maxillary device 812.

The stiffening bars extend along the length of the respective devices and aid in increasing the stiffness of the cantilevered advance device which in turn reduces the bending of the devices.

Figure 9:
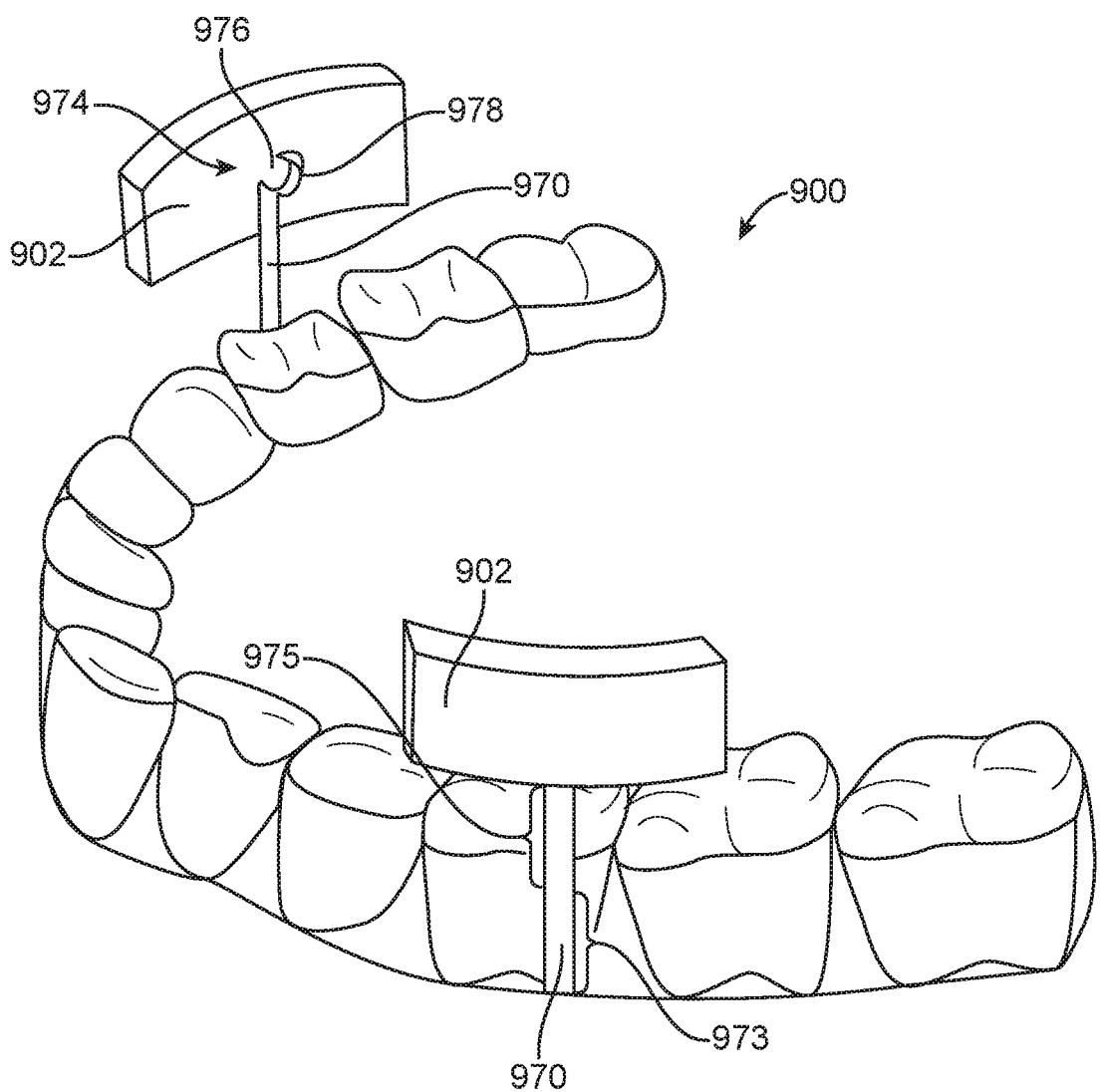
FIG. 9 depicts a class III correction appliance for the mandibular arch with lip and cheek guards, in accordance with one or more embodiments herein.

Referring now to FIG. 9, a class III correction appliance 900 with guards 902 is shown. The appliance may include features and structures similar to those of the appliance 710 shown in FIGS. 7a and 7b. For example, as with the appliance 710, the appliance 900 includes an arm or extension 970 with a coupling 974 at a terminal end thereof. The arm 970 also extends from a buccal surface of the appliance 900, for example at the buccal wall of the canine tooth receiving cavity. The arm 970 extends upwards beyond the occlusal surfaces of the appliance 900. In some embodiments, the arm extends beyond the occlusal plane of the patent when the appliance 900 is installed on the patient. The arm 970 may include both an anchored portion 973, that is coupled or integral to the buccal surface of the appliance 900 and a cantilevered portion 975 that extends away from the appliance 900.

The coupling 974 may be located at the terminal or distal end of the arm 970. The coupling 974 may be shaped to receive an elastic or a portion of an elastic. The coupling 974 may include one or more include hook shaped finger extensions 978 on one or both sides of a receptacle 976. The finger extensions 978 in combination with the receptacle 976 aid in positing an end of the elastic 918 at a particular location in space relative to the patient's jaw or relative to one or more of the appliances.

As shown in FIG. 9, the appliance 900 includes one or more guards 902 at the distal ends of the arms 970. During class III malocclusion correction, the upper teeth are advanced forward, however, the upper lip and cheeks that come in contact with the teeth of the upper arch can impart forces on the teeth that counter act the forces applied to the teeth to correct the class III malocclusion. The guards 902 are shaped such that they hold the lips and cheeks away from the teeth of the upper arch of the patient and transfer the forces of the lips to the lower arch or elsewhere, thereby relieving the upper arch of the forces that would otherwise be applied thereto, such that growth of the maxilla is less restrained. Such a configuration allows the maxillary arch to move without being subjected to the all the forces of the lips and cheeks.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for correcting malocclusions of a patient comprising:
    a maxillary appliance having tooth receiving cavities shaped to receive teeth of the maxilla and a first coupling disposed at a first distance away from an occlusal plane towards the gingival line of the patient, wherein the first coupling is configured for receiving an elastic;
    a mandibular appliance having tooth receiving cavities shaped to receive teeth of the mandible; and
    a corrective appliance having (i) a first mount shaped to engage with the mandibular appliance of the patient at a first location and having a second coupling shaped to receive the elastic, (ii) a second mount shaped to engage with the mandibular appliance of the patient at a second location, and (iii) an arm extending from the first mount to a position away from the occlusal surface of the first mount towards the gingival line, the second coupling located at a terminal end of the arm.

2. The system of claim 1, wherein the first location and second location are of respective first and second canines of the patient.

3. The system of claim 1, further comprising:
a bridge extending between and connecting the first mount and the second mount, the bridge having a surface shaped to match a lingual facing anterior surface of the patient's mandibular arch.

4. The system of claim 1, wherein the second coupling is at the first distance away from the occlusal plane towards the gingival line of the patient.

5. The system of claim 1, wherein the first mount is shaped to engage with the mandibular appliance of the patient at the central incisors.

6. The system of claim 1, wherein:
the first coupling is located at the first distance away from the occlusal plane towards the gingival line of the patient and the second coupling is located a second distance above the occlusal plane of the patient, the first distance being equal to the second distance.

7. The system of claim 1, wherein:
the first coupling is located the first distance away from the occlusal plane towards the gingival line of the patient and the second coupling is located a second distance away from the occlusal plane towards the gingival line of the patient, the first distance being greater than the second distance.

8. The system of claim 1, further comprising:
a guard attached to the second coupling and shaped to displace the lips or the cheeks of the patient away from the teeth of the patient.

9. The system of claim 1, further comprising:
a first maxillary device extending from a buccal surface of the maxillary appliance and having a first engagement surface; and
a second mandibular device extending from a buccal surface of the mandibular appliance and having an engagement surface, wherein the engagement of the first engagement surface with the second engagement surface advances the maxilla of the patient in an anterior direction.

10. The system of claim 9, wherein the maxillary appliance is a transpalatal appliance and includes a transpalatal extension that extends between the tooth receiving cavities of a left side of the maxillary appliance and the tooth receiving cavities of a right side of the maxillary appliance.

11. The system of claim 1, wherein:
the tooth receiving cavities of the maxillary appliance are shaped to reposition at least one tooth of the maxillary arch; and
the tooth receiving cavities of the mandibular appliance are shaped to reposition at least one tooth of the mandibular arch.

12. The system of claim 1, wherein:
the corrective appliance is shaped to releasable couple to the mandibular appliance.

13. The system of claim 1, further comprising:
a first appliance coupling at an external surface of the mandibular appliance; and
a second appliance coupling at a tooth facing surface of the corrective appliance, the first appliance coupling and the second appliance coupling shaped to match each other and releasably couple the mandibular appliance to the corrective appliance.

14. A system for correcting malocclusions of a patient comprising:
a maxillary appliance having tooth receiving cavities shaped to receive and reposition the teeth of the maxilla and a first coupling for receiving an elastic;
a corrective appliance having tooth receiving cavities shaped to receive teeth of the mandible and a second coupling shaped to receive the elastic, and
an arm extending from the corrective appliance to a position away from the occlusal surface of the corrective appliance towards the gingival line, the second coupling located at a terminal end of the arm.

15. The system of claim 14, wherein the second coupling extends from a buccal surface of corrective appliance at the location of the central incisors.

16. The system of claim 14, wherein:
the first coupling is located the first distance away from the occlusal plane towards the gingival line of the patient and the second coupling is located a second distance away from the occlusal plane towards the gingival line of the patient, the first distance being equal to the second distance.

17. The system of claim 14, wherein:
the first coupling is located a first distance away from the occlusal plane towards the gingival line of the patient and the second coupling is located a second distance away from the occlusal plane towards the gingival line of the patient, the first distance being greater than the second distance.

18. The system of claim 14, wherein:
the tooth receiving cavities of the maxillary appliance are shaped to reposition at least one tooth of the maxillary arch; and
the tooth receiving cavities of the corrective appliance are shaped to reposition at least one tooth of the mandibular arch.

19. The system of claim 14, further comprising:
a guard attached to the second coupling and shaped to displace the lips or the cheeks of the patient away from the teeth of the patient.

20. The system of claim 14, further comprising:
a first maxillary device extending from a buccal surface of the maxillary appliance and having a first surface; and
a second maxillary device extending from a buccal surface of the corrective appliance and having an engagement surface, wherein the engagement of the first engagement surface with the second engagement surface advances the maxilla of the patient in an anterior direction.

* * * * *